United States Patent
Calusinski et al.

(10) Patent No.: US 11,392,920 B1
(45) Date of Patent: Jul. 19, 2022

(54) SMARTPHONE APPLICATION FOR SECURING PURCHASE TRANSACTIONS BETWEEN A CUSTOMER AND A MERCHANT WITH SELF-CHECKOUT

(71) Applicant: UIPCO, LLC, San Antonio, TX (US)

(72) Inventors: Jeff Calusinski, San Antonio, TX (US); Ravi Durairaj, San Antonio, TX (US); Brennen Ricks, San Antonio, TX (US); Ruthie D. Lyle, Durham, NC (US); Vidya Nagarajan, Frisco, TX (US); Sharonda Phillips, Flower Mound, TX (US); David M. Jones, Jr., San Antonio, TX (US); Jon McEachron, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/369,985

(22) Filed: Mar. 29, 2019

Related U.S. Application Data

(60) Provisional application No. 62/786,065, filed on Dec. 28, 2018.

(51) Int. Cl.
*G06Q 20/32* (2012.01)
*G06Q 20/02* (2012.01)
(Continued)

(52) U.S. Cl.
CPC ....... *G06Q 20/3223* (2013.01); *G06K 7/1404* (2013.01); *G06Q 20/023* (2013.01);
(Continued)

(58) Field of Classification Search
CPC ............ G06Q 30/063; G06Q 20/3223; G06Q 20/023; G06Q 20/12; G06Q 20/3221; G06Q 20/405; G06Q 30/0226; G06K 7/1404
(Continued)

(56) References Cited

U.S. PATENT DOCUMENTS 6,363,164 B1  3/2002  Jones
8,180,705 B2  5/2012  Kowalchyk
(Continued)

FOREIGN PATENT DOCUMENTS

AU   2017100350 A4 * 6/2017
EP      2642445 A1 * 9/2013 ............. G06Q 20/20
(Continued)

OTHER PUBLICATIONS

"Wirecard Presents its Concept for Future Point-of-Sale Infrastructure." Wirecard AG. Munich. May 22, 2014. (Year: 2014).*
(Continued)

*Primary Examiner* — Sara C Hamilton
(74) *Attorney, Agent, or Firm* — Plumsea Law Group, LLC

(57) ABSTRACT

The present disclosure relates to a mobile computing device that is configured to secure a purchase transaction between a customer and merchant, and facilitate self-checkout between the user and any of several merchants. The system provides a payment processing network that achieves secure transactions free from fraud, while also having low fees. The system is based on establishing a relationship between a merchant's bank and a customer's bank, prior to a purchase transaction by the customer. The customer may then authorize their own bank to push funds to the merchant's bank in order to purchase goods or services using their smartphone, without the need to share any financial information between
(Continued)

the user and merchant themselves. The smartphone is further configured to draw from multiple merchant product databases so that the customer may self-checkout, without the need to use a merchant-specific app, all within one app-linked system for payment and shopping.

8 Claims, 17 Drawing Sheets

(51) Int. Cl.
    *G06Q 30/02*           (2012.01)
    *G06Q 20/40*           (2012.01)
    *G06K 7/14*            (2006.01)
    *G06Q 20/12*           (2012.01)

(52) U.S. Cl.
    CPC ......... *G06Q 20/12* (2013.01); *G06Q 20/3221* (2013.01); *G06Q 20/405* (2013.01); *G06Q 30/0226* (2013.01)

(58) Field of Classification Search
    USPC .......................................................... 705/42
    See application file for complete search history.

(56) References Cited

U.S. PATENT DOCUMENTS

| | | | |
|---|---|---|---|
| 10,127,537 B1 | 11/2018 | Ellis | |
| 10,878,399 B1* | 12/2020 | Joglekar | G06Q 30/0207 |
| 2009/0319425 A1 | 12/2009 | Tumminaro | |
| 2010/0030687 A1 | 2/2010 | Panthaki | |
| 2010/0274678 A1 | 10/2010 | Rolf | |
| 2010/0280928 A1 | 11/2010 | Dempster | |
| 2011/0225057 A1* | 9/2011 | Webb | G06Q 20/32 705/16 |
| 2012/0041845 A1* | 2/2012 | Rothschild | G06Q 20/20 705/26.81 |
| 2012/0054095 A1 | 3/2012 | Lesandro | |
| 2012/0078751 A1* | 3/2012 | MacPhail | G06Q 20/12 705/26.41 |
| 2012/0095853 A1* | 4/2012 | von Bose | G06Q 30/0641 705/16 |
| 2012/0205433 A1* | 8/2012 | Dudek | G06Q 20/209 235/375 |
| 2012/0271712 A1* | 10/2012 | Katzin | G06Q 20/387 705/14.51 |
| 2012/0284130 A1* | 11/2012 | Lewis | G06Q 20/00 705/16 |
| 2013/0018715 A1* | 1/2013 | Zhou | G06Q 20/3276 705/26.7 |
| 2013/0030974 A1 | 1/2013 | Casey | |
| 2013/0030994 A1* | 1/2013 | Caiman | G06Q 30/02 705/40 |
| 2013/0048721 A1* | 2/2013 | Rasband | G06F 16/9554 235/383 |
| 2013/0110654 A1* | 5/2013 | Kobres | G06Q 20/204 705/16 |
| 2013/0110728 A1* | 5/2013 | Kobres | H04W 12/10 705/78 |
| 2013/0185206 A1* | 7/2013 | Leggett | G06Q 20/405 705/44 |
| 2013/0191232 A1* | 7/2013 | Caiman | G07F 19/201 705/18 |
| 2013/0254114 A1* | 9/2013 | Smith | G06Q 20/3274 705/18 |
| 2013/0256403 A1* | 10/2013 | MacKinnon Keith | G06Q 20/20 235/375 |
| 2013/0346302 A1* | 12/2013 | Purves | G06Q 30/04 705/40 |
| 2014/0006195 A1* | 1/2014 | Wilson | G06Q 20/20 705/21 |
| 2014/0046794 A1* | 2/2014 | Vallery | G06Q 30/0633 705/26.7 |
| 2014/0058946 A1* | 2/2014 | Paranjape | G06Q 20/208 705/44 |
| 2014/0249948 A1* | 9/2014 | Graylin | G06Q 20/326 705/21 |
| 2014/0263631 A1* | 9/2014 | Muniz | G06Q 20/208 235/383 |
| 2014/0344041 A1* | 11/2014 | Yeleswarapu | G06Q 20/322 705/14.23 |
| 2015/0112866 A1 | 4/2015 | Muthu | |
| 2015/0199657 A1 | 7/2015 | Castinado | |
| 2015/0363771 A1* | 12/2015 | Graylin | G06Q 20/409 705/65 |
| 2015/0379497 A1* | 12/2015 | Florez | G06Q 20/3224 705/17 |
| 2016/0247141 A1* | 8/2016 | Graylin | G06K 19/06037 |
| 2016/0260090 A1* | 9/2016 | Healy | G06Q 20/367 |
| 2016/0283918 A1 | 9/2016 | Weiflash | |
| 2016/0358145 A1* | 12/2016 | Montgomery | G06Q 20/208 |
| 2016/0379297 A1* | 12/2016 | Aspholm | G06K 7/10554 705/26.8 |
| 2017/0046707 A1* | 2/2017 | Krause | G06Q 20/203 |
| 2017/0158215 A1* | 6/2017 | Phillips | B62B 5/0096 |
| 2017/0193478 A1* | 7/2017 | Dhurka | G07G 1/0054 |
| 2017/0200152 A1* | 7/2017 | Winkler | G06Q 20/327 |
| 2017/0300881 A1 | 10/2017 | Weinflash | |
| 2017/0300980 A1* | 10/2017 | Soldate | G06Q 20/208 |
| 2018/0068374 A1* | 3/2018 | Turlay | G06Q 30/0633 |
| 2018/0130078 A1* | 5/2018 | Jones | G06Q 30/0205 |
| 2018/0240095 A1* | 8/2018 | Buckley | G06Q 30/0601 |
| 2018/0308118 A1* | 10/2018 | Biswal | G06Q 30/0215 |
| 2018/0374327 A1* | 12/2018 | Enekwa | G08B 13/246 |
| 2019/0012645 A1 | 1/2019 | Subramaniam | |
| 2019/0114615 A1* | 4/2019 | Cyr | G06Q 20/204 |
| 2020/0000248 A1* | 1/2020 | Jain | G07G 1/0036 |
| 2020/0042972 A1* | 2/2020 | Wang | G06Q 20/385 |
| 2020/0074438 A1* | 3/2020 | Boemi | G06Q 20/3223 |
| 2020/0118110 A1* | 4/2020 | Coverstone | G06Q 20/3278 |
| 2020/0342438 A1* | 10/2020 | Chew | G06Q 20/401 |
| 2020/0372494 A1* | 11/2020 | Ramanathan | G06Q 20/10 |

FOREIGN PATENT DOCUMENTS

| | | | | |
|---|---|---|---|---|
| EP | 2863355 A1 * | 4/2015 | ........ | G06Q 30/0238 |
| WO | WO-2017044981 A1 * | 3/2017 | ............ | G06Q 20/20 |

OTHER PUBLICATIONS

Non-Final Office Action dated Mar. 19, 2021 for U.S. Appl. No. 16/369,561.

* cited by examiner

SMARTPHONE APPLICATION FOR SECURING PURCHASE TRANSACTIONS BETWEEN A CUSTOMER AND A MERCHANT WITH SELF-CHECKOUT

CROSS-REFERENCE TO RELATED APPLICATIONS

This application claims the benefit of Provisional Patent Application No. 62/786,065 filed Dec. 28, 2018, and titled "Smartphone Application for Securing Purchase Transactions Between a User and a Merchant with Self-Checkout," which is incorporated by reference herein in its entirety.

TECHNICAL FIELD

The present disclosure relates to the field of payment processing networks and banking security, and smartphone apps that enable them. Payment processing networks enable fast and convenient purchase transactions between customers and merchants, while also balancing the needs for security and low fees. Mobile computing device applications are used to interface with payment processing networks, and allow customers to quickly and easily purchase goods from merchants.

BACKGROUND

Modern banking and shopping practices commonly rely on any of several types of well-known payment processing networks. A payment processing network may generally be any system that handles transactions from various channels, such as credit cards and debit cards, that enable a customer to pay a merchant for goods or services. That is, they transfer money (directly or indirectly) from a customer's bank to the merchant's bank in the amount of a purchase. Payment processing networks may often be run by a third party payment processor, such as the major credit card companies Visa, MasterCard, American Express, and Discover. However, other payment processing networks may operate without a private third party company being involved as an intermediary.

In particular, the credit card payment processing networks are some of the most widely known and used of all payment processing networks in the world. Credit cards offer several well-known advantages when used by merchants and customers for payment. For example, from the merchant's perspective, credit cards generally are very good at instantly verifying the availability of a customer's funds/credit limit. This allows merchants to accept non-cash payment from a wide variety of customers, without having to establish a relationship with each individual customer, without fear of the customer reneging on payment.

For example, FIG. 1A shows a prior art diagram of how a credit card payment network generally operates. Generally, a customer 102 engages in a purchase transaction with a merchant 104 using a credit card 106 that interfaces with a merchant's credit card reader 108 at step 151. Merchant 104 then interfaces with a third party credit card payment processor 114 at step 153, relaying information about the purchase in order to ensure that the customer is properly authorized. Third party credit card payment processor 114 then interfaces with bank 110 that issued the customer's 102 credit card 106 at step 115, checking with bank 110 that the customer 102 has sufficient funds or credit to complete the purchase transaction. Customer's bank 110 then responds to the third party payment processor 114 with its answer, authorizing or declining the transaction, at step 157. The third party payment processor 114 then relays this authorization/decline back to merchant 104 at step 159. Merchant 104 then allows customer 102 to complete the purchase at step 161, As is widely known, steps 151, 153, 155, 157, 159 and 161 can occur very quickly, in as little as seconds. This is one of the advantages of a the credit card payment network.

However, as is also shown in FIG. 1A, credit card payment network also includes transferring the funds used in the purchase transaction—and this includes various fees, Namely, customer's bank 110 engages in settlement 163 with the third party credit card payment processor 114—minus an interchange fee. The interchange fee is commonly between 2% and 3% of the purchase transaction price plus a flat fee per transaction of around $0.15. Third party credit card payment processor 114 then settles with the merchant's bank 112 at step 165. The merchant's bank 114 then settles with the merchant's account therein at step 167, while also charging fees.

Accordingly, when a credit card transaction takes place the issuing bank 110 (customer's 102 bank) pays the acquiring bank 112 (merchant's 104 bank) for their cardholder's purchase less the interchange fee for the transaction. The acquiring bank 112 then pays their merchant from the remaining balance minus a markup for processing the transaction. Merchant 104 ultimately receives the gross amount of the sale minus a series of base costs and markups that include interchange, dues, assessments and the processor's markup.

These fees are the price that merchant 104 pays for the convenience of accepting payment through the credit card payment processor network. On the one hand, this allows merchants to serve more customers while having a reasonable level of trust that they will receive payment. On the other hand, these fees eat into the merchant's profit margins. For some merchants, the buying behavior of customers 102 make the need for accepting credit card payments unavoidable. For example, credit card transactions are most commonly used to purchase goods when the purchase price and timing of the purchase transaction are unknown in advance.

However, in other scenarios, a different type of payment network such as is shown in FIG. 1B may be more appropriate for all parties involved, FIG. 1b shows a payment network that debits from a customer's 102 checking account 116 at customer's bank 110, In this type of transaction, customer 102 usually receives a bill for some goods or services from merchant 104 at step 173. The customer 102 then shares their checking account information 116 with merchant 104 at step 175. Merchant 104 then relays the customer's checking account information 116 to the merchant's bank 112. The merchant's bank 112 then "pulls" the funds from the customer's bank 110 by transmitting a request at step 179, The customer's bank 110 then transfers the funds electronically to the merchant's bank 112 at step 181.

This type of transaction commonly uses the Automated Clearing House ("ACH") payment network, that allows banks to move funds between checking accounts with no (or, extremely low) fees. The ACH network in the United States is organized by the National Automated Clearing House Association ("NACHA"), however NACHA does not act as a third party payment processor. The funds are moved through the governmental organization the Federal Reserve or the Electronic Payments Network that is owned by some 20 major banks.

One drawback to ACH based transfers is that permission must be granted for the money to move, on a merchant-by-merchant basis, Usually, a consumer 102 gives a merchant 104 permission to "pull" money from the consumer's checking account at bank 110, to pay a bill on a reoccurring monthly basis. For example, a consumer 102 will give their cellphone provider 104 permission to debit the consumer's checking account each month to pay for the monthly cellphone charges on an automated payment plan—and the same with utilities like electric service or water service. This requirement for merchant-by-merchant permission may not be overly cumbersome when consumer 102 does reoccurring business with the merchant, in amounts that are reasonably predictable. However, for irregular transactions at unpredictable times, this type of payment network may be less than ideal for the merchant because it does not allow the merchant to verify the funds before a purchase transaction occurs.

Thus, existing payment processing networks do not currently offer a way for merchants to be assured of receiving electronic payments from a customer in a manner that is simultaneously secure, verified, and low in fees.

Furthermore, customers also suffer several disadvantages of existing payment processing networks. Namely, customers must carry a credit card with them at all times in order to be ready to conduct a purchase transaction. While this may be an improvement over carry large amounts of cash, this nonetheless may present an inconvenience to the customer. Alternatively, customers must be willing to share their checking account information with a merchant. Customers may find this acceptable with some merchants, such as their cell phone company with whom they have a long-standing business relationship—but may not be willing to share such sensitive information with all merchants.

Many customers use their smartphone mobile computing devices to interact with their financial institution. Most banks have a secure "app" that enables the banking customer to log into their customer profile, and view and interact with all their accounts at that bank. Many people in this day and age are never without their smartphone, bringing their smartphone with them at all times—including when shopping. There are many smartphone apps that help customers when shopping, including merchant specific apps that allow a user to engage only with one particular merchant, or payment apps like PayPal or Apple Pay that facilitate payments across a private third party payment processor. One popular type of merchant-specific app is a "scan-n-go" application that enables a user to scan products to be purchased from a particular merchant, and check out without needing to interact with a cashier. Popular scan-n-go apps are offered by stores such as H-E-B, Sam's Club, and Amazon Go.

However, existing scan-n-go applications are generally limited to only one merchant. The user must therefore download several different apps in order to interact with multiple merchants in this manner. Furthermore, existing scan-n-go applications merely use existing payment processing networks—with all the of drawbacks as discussed above.

Accordingly, there is a need in the art for systems, devices, and methods that addresses the shortcomings of the prior art discussed above.

SUMMARY

In one aspect, the disclosure provides a mobile computing device configured to: (1) allow a user to log into a user portal associated with a first financial institution; (2) receive an input from the user to commence a purchase transaction between the user and a merchant; (3) access account balance information regarding funds available in a cash-equivalent account associated with the user, at the first financial institution; (4) receive a product input for each product being purchased by the user; (5) access a product database associated with the merchant, the product database including prices of products sold by the merchant; (6) compare the product input to the product database and compute a purchase transaction price; (7) compare the purchase transaction price with the funds available in the user's cash-equivalent account; (8) receive an input from the user that the purchase transaction is ready to be checked-out; (9) recall information from the first financial institution describing a pre-established transfer association, between the first financial institution and a second financial institution associated with the merchant, from a merchant transfer association database; (10) cause the first financial institution to initiate a transfer of funds from an initiating cash-equivalent account at the first financial institution directly to a receiving cash-equivalent account at the second financial institution, in accordance with the pre-established transfer association; and (11) generate and display a message that the purchase transaction is successfully completed, the message being configured such that it enables the merchant to verify completion of the purchase transaction.

In a second aspect, this disclosure provides a mobile computing device configured to: (1) allow a user to log into a user portal associated with a first financial institution; (2) receive an input from the user to commence a purchase transaction between the user and a merchant; (3) access account balance information regarding funds available in a cash-equivalent account associated with the user, at the first financial institution; (4) receive a product input for each product being purchased by the user, by scanning a machine readable code using a camera in the mobile computing device; (5) access a product database containing product information, the product database being associated with two or more different merchants, and receive product information associated with the merchant with whom the purchase transaction was commenced by receiving an input that includes scanning a machine readable code generated by the merchant, using a camera in the mobile computing device; (6) compare the product input to the product information and compute a purchase transaction price; (7) compare the purchase transaction price with the funds available in the user's cash-equivalent account; (8) receive an input from the user that the purchase transaction is ready to be checked-out; (9) recall information from the first financial institution describing a pre-established transfer association, between the first financial institution and a second financial institution associated with the merchant, from a merchant transfer association database; the merchant transfer association database including information describing two or more pre-established transfer associations, each of the two or more pre-established transfer associations being associated with a different merchant; (10) cause the first financial institution to initiate a transfer of funds from an initiating cash-equivalent account at the first financial institution directly to a receiving cash-equivalent account at the second financial institution, in accordance with the pre-established transfer association; and (11) generate and display on the mobile computing device a machine readable message that the purchase transaction is successfully completed.

Finally, in another aspect, this disclosure provides a mobile computing device configured to: (1) allow a user to log into a user portal associated with a first financial institution; (2) receive an input from the user to commence a purchase transaction between the user and a merchant; (3) access account balance information regarding funds available in a cash-equivalent account associated with the user, at the first financial institution; (4) receive a product input for each product being purchased by the user; (5) access a product database associated with the merchant, the product database including prices of products sold by the merchant; (6) compare the product input to the product database and compute a purchase transaction price; (7) compare the purchase transaction price with the funds available in the user's cash-equivalent account; (8) receive an input from the user that the purchase transaction is ready to be checked-out; (9) recall information from the first financial institution describing a pre-established transfer association, consisting essentially of an account number and routing number for a receiving cash-equivalent account associated with the merchant at a second financial institution, from a merchant transfer association database; (10) cause the first financial institution to initiate a transfer of funds from the user's cash-equivalent account at the first financial institution directly to the receiving cash-equivalent account at the second financial institution, in accordance with the pre-established transfer association, via the Federal Reserve Automated Clearing House network; (11) generate and display a message that the purchase transaction is successfully completed, the message being configured such that it enables the merchant to verify completion of the purchase transaction; (12) generate and send a message to the user after the purchase transaction is completed regarding available funds in the user's cash-equivalent account; and (13) generate and send instructions to the first financial institution causing the first financial institution to place a temporary hold on an amount of funds in the users cash-equivalent account equal to the purchase transaction price, the temporary hold expiring when the funds are transferred to the second financial institution.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Systems to secure and verify a purchase transaction between a customer and a merchant are broadly disclosed that enable the merchant to reliably receive funds from the customer with no to very-low fees. Related methods and apparatuses, such a mobile computing device aka smartphone, are also disclosed—as well as a non-transitory computer readable storage medium including instructions which, when executed by one or more computing devices, carry out a method for securing a purchase transaction between a customer and a merchant.

Most broadly, a system for facilitating and processing payments between a customer and a merchant may include a pre-established transfer association between the merchant's bank and the customer's bank. This pre-established transfer association may involve the merchant's bank sharing relevant account information, associated with the merchant, with the customer's bank. As a result of this pre-established transfer association, the customer may then initiate a transfer of funds associated with a purchase transaction whenever (and in whatever amount) the customer desires to shop with the merchant. A mobile computing device may also be configured to further facilitate the customer's shopping, by allowing the customer to input information associated with items sold by the merchant into the mobile computing device and completing the purchase transaction without human assistance.

In this way, this disclosure provides various systems and smartphone apps that save the merchant money: by reducing payment processing transaction fees, and reducing the need for cashier employees. The costs savings to the merchant in this way provide an incentive to the merchant to opt-in to creating the pre-established transfer association. The customer also benefits from a such a system, as their purchase transaction can be rung-up and completed within a single smartphone app without the need to rely on another payment method such as carrying a credit card on their person.

Figure 2:
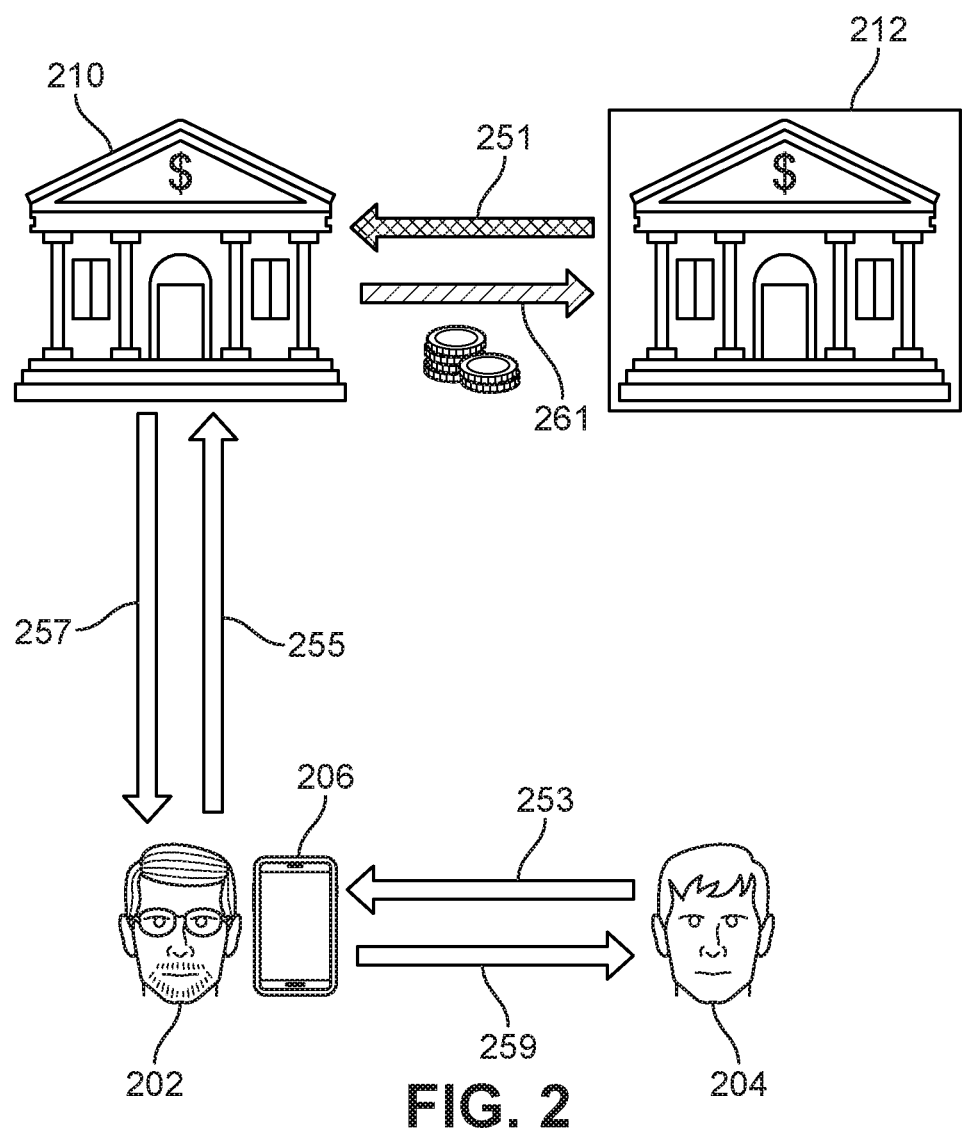
FIG. 2 shows a payment processing network in accordance with this disclosure, where a customer's bank pushes funds to a merchant's bank.

In particular, FIG. 2 shows a payment processing network in accordance with this disclosure. This figure is a diagram showing the relationships between various parties and institutions involved in a purchase transaction. Namely, customer 202 wishes to purchase goods or services from merchant 204.

Prior to the purchase transaction, merchant 204 has previously directed his bank 212 to establish a transfer association between the merchant's bank 212 and the customer's bank 210, per 251. The pre-established transfer association between merchant's bank 212 and customer's bank 210 may include a variety of types of information, but in particular may include the routing and account number for a receiving cash-equivalent account at bank 212.

Once the pre-established transfer association between merchant bank 212 and customer bank 210 has been created, customer 202 may use their smartphone 206 to begin a purchase transaction. The purchase transaction may begin by receiving some information from the merchant at step 253. For example, the smartphone may receive product information, a checkout code that is manually entered by the user, a checkout code that is machine readable, or an electronic contactless communication, from the merchant 204. The customer's may then cause his smartphone 206 to relay information about the purchase transaction to the customer's bank 210 at step 255.

The customer's bank 210 may also be referred to as the "originating" bank, because the funds for the purchase transaction originate at this bank. Furthermore, the terms "bank" and "financial institution" are generally used interchangeable throughout this disclosure. These terms are understood in this context to refer to any institution that offers consumer or corporate banking services. These terms may therefor include various institutions that are otherwise classified as "banks", "credit unions", "thrift institutions", "savings and loan associations", and others.

Customer's bank 210 then compares at least a purchase transaction price with the funds available in an account associated with the customer. Generally, the customer's account at bank 210 may be any cash-equivalent account— such as a checking account, savings account, a money market fund, or other account that is considered similarly liquid. By comparing the funds available in the customer's account with the purchase transaction price, the payment processing network verifies funds prior to completion of the purchase transaction. This verification is done elegantly, because the customer 202 is merely checking into his own bank 210. The relationship between the customer 202 and his own bank 210 will likely be longstanding and trustworthy, therefore customers 202 will not need the services of a private third party payment processor to verify funds, but will instead be able to check funds to be used in the purchase transaction using the same smartphone app as they would check their accounts in circumstances apart from any purchase transaction.

Once the verification of the customer's funds at bank 210 is done, the bank 210 may then initiate a transfer of funds from bank 210 to merchant's bank 212. This initiation is done in accordance with the pre-established transfer association between these two banks. In this way, bank 210 will already have the information necessary to conduct a transfer of funds from itself to the merchant's financial institution— so that the transfer may be initiated by the customer when the customer desires, without any need to interrupt the purchase transaction to otherwise share financial or banking information.

Bank 210 then generates and sends a message back to the customer 202 at step 257. This message may be a verification message, confirming that the funds in the customer's account exceeded the transaction purchase price, and that therefore the purchase transaction was allowed to proceed and the funds transfer was initiated. This message may be a simple plain language text popup within the mobile computing device app, "Your transaction was approved."

The customer 202 may then share this message with merchant 204 at step 259. The message may be configured so as to verify the transaction to both the customer and the merchant that the funds transfer has been initiated, and therefore the purchase transaction has been successfully completed. For example, the message may include a machine readable code such as a OR code or a UPC code that may be scanned by a machine operated by merchant 204.

Figure 3:
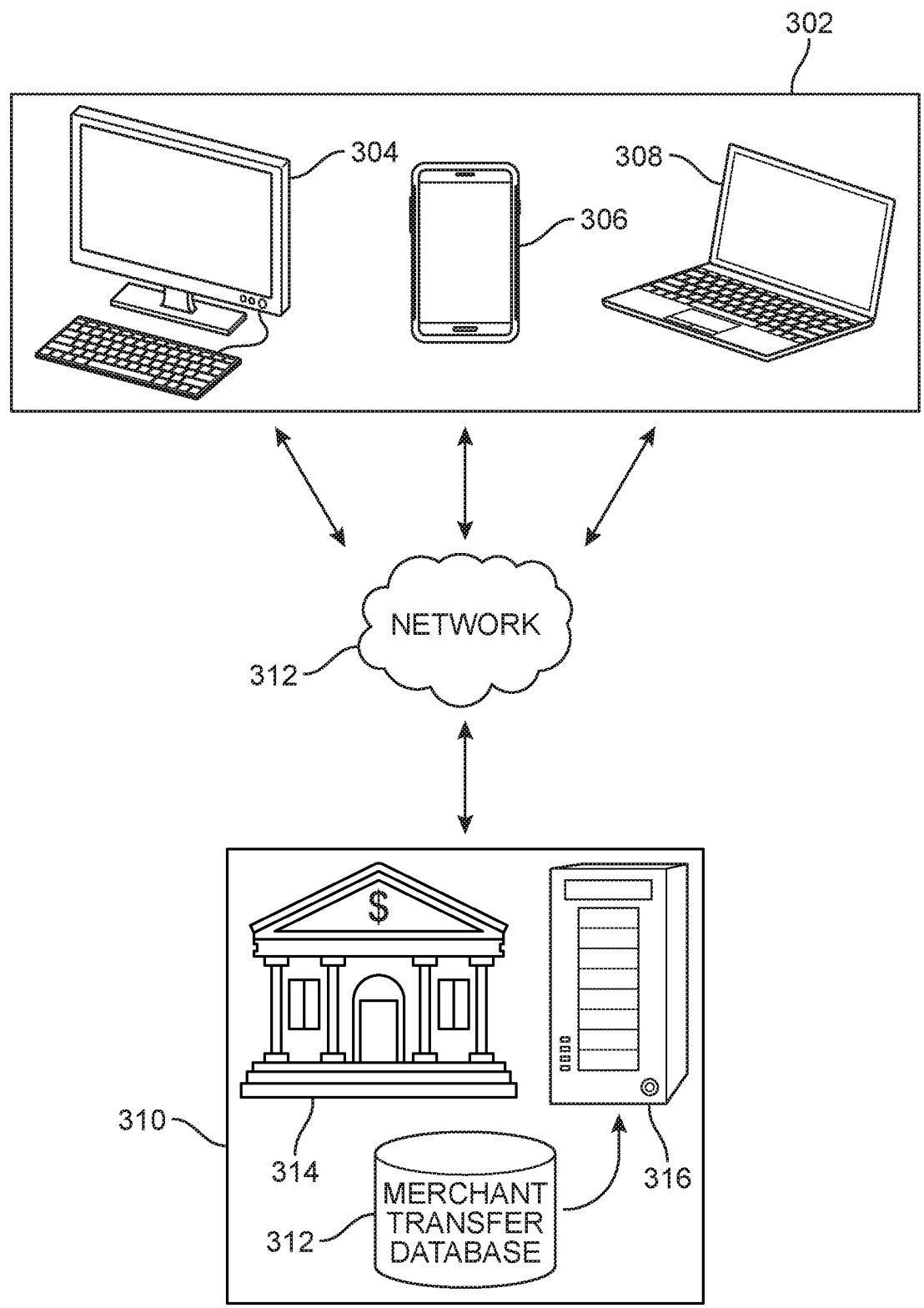
FIG. 3 shows a system that operates a payment processing network, including at least one computer device that includes a processor.

Finally, settlement funds occurs in step 261. That is, the step at which funds are actually (electronically or otherwise) moved from the originating financial institution to the merchant's financial institution occurs at a later time, after the purchase transaction itself has been completed. In this step, funds may be transferred directly from an initiating cash-equivalent account at the originating financial institution directly to a receiving cash-equivalent account at the merchant's financial institution without the use of an independent private third party payment processor. The initiating cash-equivalent account may be the user's own account, or it may be another account within the originating financial institution. Similarly, the receiving cash-equivalent account at the merchant's financial institution may be the merchant's own account, or it may be another account within the merchant's financial institution, FIG. 3 next shows a system that operates a payment network in accordance with this disclosure. The system may include a variety of user input devices 302, such as desktop computer 304, mobile computing device 306, or laptop computer 308. Generally, as long as a user may input an electronic signal regarding a purchase transaction, the particular device used to do so may be within the scope of this disclosure.

The user input devices 302 may be in communication with a network 312. Network 312 generally includes the hardware and software used to communicate a message from a user to the originating bank 310. Network 312 may include wireless cell phone networks such as 3G or LTE, Wi-Fi networks, and the vast multitude of hardwired cable communications hardware that make up the backbone of the internet.

Originating bank 310 then receives an input from the devices 302 via network 312. Originating bank 310 generally includes at least one computing device 316 that includes a processor and other general purpose computing hardware that enables computing device 316 to execute programmed instructions. Originating bank 310 includes not only the physical bank itself 314, but also the at least one computing device 316 and a merchant transfer database 318 in communication with the at least one computing device 316. In this way, computing device may be owned, operated, and controlled by the originating bank 310. Merchant transfer database 318 may also be owned, operated, and controlled by originating bank 310.

Merchant transfer database 318 may be a database created and maintained by originating bank 310 to store the pre-established transfer relationships between originating bank 310 and the merchant's bank 212. As this information must be received by originating bank 310 before a purchase transaction can commence, the information described in the pre-existing transfer association would be stored by the originating bank 310 until such time as needed.

In some embodiments, the pre-established transfer relationship may include merchant account information. Specifically, in some embodiments, the merchant account information that is stored in the merchant transfer database 318 may include an account number and routing number for the merchant's receiving cash-equivalent account at the merchant's financial institution. In some embodiments, the account number and routing number for the merchant's receiving cash-equivalent account may be the only information that is necessary for the customer's bank 310 to transfer funds to the merchant's bank 212. Namely, an Automated Clearing House ("ACH") network transfer that is "pushed" from the customer's originating bank 310 to the merchant's bank 212 need only have the account number and routing number for the merchant's receiving cash-equivalent account in order for the funds to be moved. In such embodiments, the merchant account information that is stored in the merchant transfer database as part of the pre-established transfer association may consist essentially of an account number and routing number for the merchant's receiving cash-equivalent account at the merchant's financial institution.

That the at least one computing device 316 and the merchant transfer database 318 may be owned, operated, and controlled by the originating bank 310 ensures that the payment network may operate without private third party involvement in the purchase transaction. This configuration may ensure that the merchant's bank need share financial information (about a receiving account) only with the consumer's bank, and need not otherwise share this sensitive information with other parties. The merchant's bank may be more willing to share this information with a trusted fellow banking institution than with private third parties. This configuration may also ensure that the user's trust and familiarity with the originating bank 310, as the customer's own bank, can be used to drive adoption and wide usage of the payment processing network described herein. A user may generally be more trustful of their own bank, with all the attendant security features and customer service, with a funds transfer transaction than an otherwise unknown smartphone app startup. This configuration therefore offers multiple advantages for both the merchant and the customer/user.

In some embodiments, computing device 316 is configured to operate the payment processing network discussed above and throughout herein.

Figure 4:
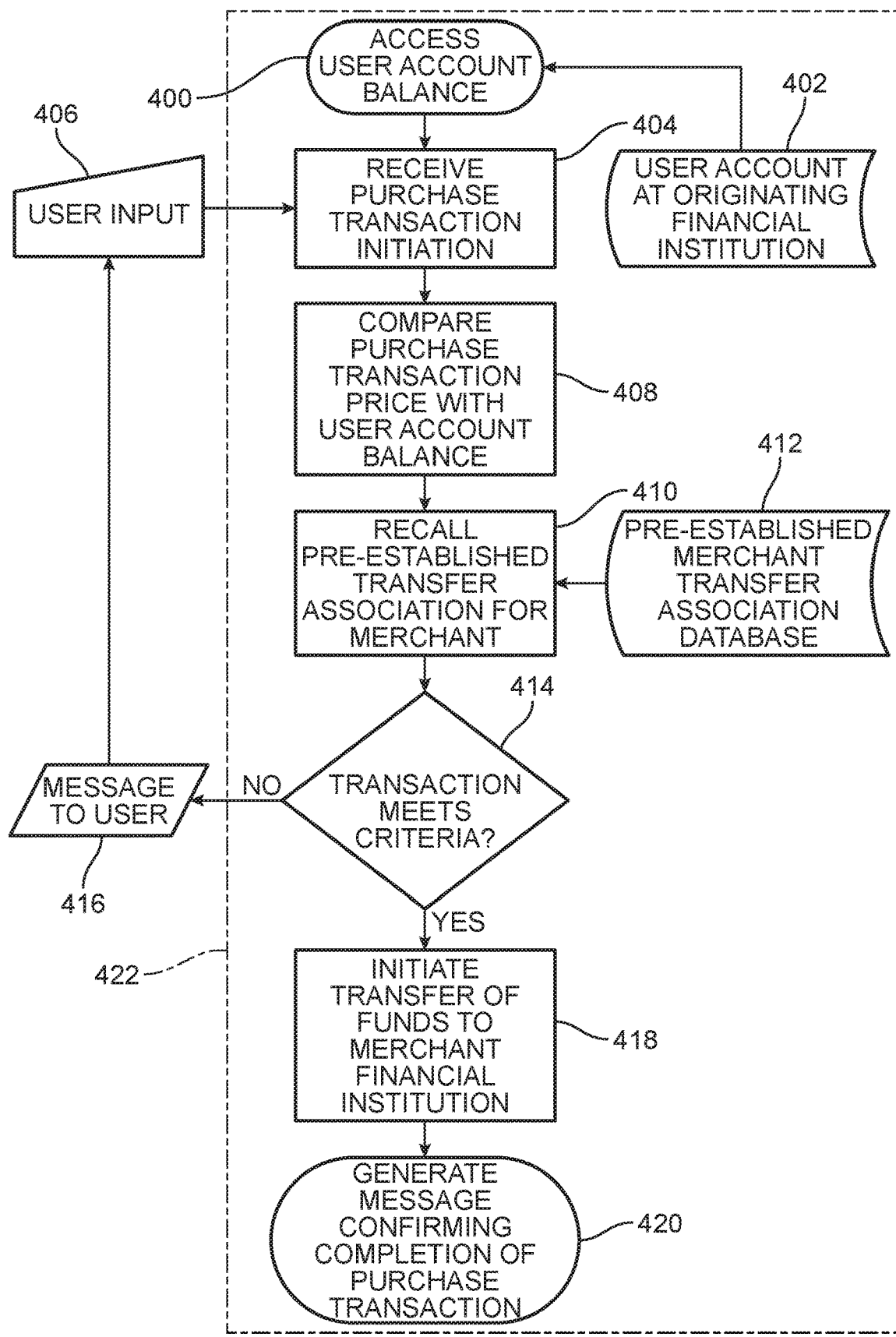
FIG. 4 shows a flow chart of a method for operating a payment processing network in accordance with this disclosure, from the perspective of the system operating the network.

FIG. 4 shows a flowchart of the steps involved in conducting a purchase transaction using the payment processing network disclosed herein, as conducted by the at least one computing device 316. These steps are similar to as discussed above, but are described as from the perspective of the computing device 316—and additional features and details are also disclosed.

In some embodiments, a system that includes the at least one computing device 316 controls and performs the steps of the payment processing network disclosed herein. However, in other embodiments the payment processing network may be executed from a non-transitory computer readable storage medium including instructions which, when executed by one or more computing devices, carry out a method for operating the payment processing network disclosed herein.

First, computing device 316 may be configured to access account balance information regarding funds available in a user's account at the originating financial institution at step 400. The user's account information may be stored in database 402 which computing device 316 accesses. Generally, as discussed above, computing device 316 and all of the steps performed by computing device 316 may be within the originating financial institution, as shown in FIG. 4 by boundary 422. Therefore, computing device 316 would be able to access the user's account database 402, because both are under the control of the user's own bank (that is the originating financial institution).

Next, in step 404 the computing device 316 may receive a request, set from the user 406 to the originating financial institution 422, to commence a purchase transaction. This request may include information about the purchase transaction such as the purchase transaction price, as well as other information. Computing device 316 may then compare the purchase transaction price with the amount of funds available in the user's account.

In step 410, computing device 316 recalls the pre-established transfer association for the merchant from merchant transfer database 412. In some embodiments, the pre-established transfer association may be made up of merchant account information comprising an account number and a routing number of the merchant's account at the merchant's bank. In other embodiments, the pre-established transfer association may also include additional information beyond just the merchant's account inform. For example, the pre-established transfer association may include one or more criteria for allowing the purchase transaction to be completed. These one or more criteria may be defined by any of the user, the merchant, the merchant's bank, or the originating bank.

In particular embodiments, the one or more criteria may be based on a factor selected from the group consisting of: purchase transaction price amount, prior transaction history between the user and the merchant, a nature of goods or services being transacted, relationship between the purchase transaction price and the amount funds available in the user's cash-equivalent account, time and date at which the purchase transaction occurs in relation to business hours, and combinations thereof. These criteria may allow any of the parties involved in the transaction to set appropriate risk mitigating standards for conditions under which they will allow or not allow the purchase transaction, and related transfer of funds, to occur.

For example, some banks may wish to exclude a purchase transaction based on the nature of the goods or services being transacted. Currently, some payment processing networks exclude certain merchants entirely, such as merchant who sell substances legal under some state's laws but not currently legal under U.S. federal law. In accordance with this disclosure, the present features may allow a merchant to conduct purchase transaction using a payment processing network in accordance with this disclosure—but only when the specific goods being purchased by the customer do not include a specific prohibited item. In other embodiments, criteria like the prior transaction history between the user and the merchant may be used when the customer is attempting to purchase an abnormally large amount of goods having a much higher than normal purchase transaction price. In yet other embodiments, a merchant or bank may wish to set a criteria of a relationship between the purchase transaction price and the amount funds available in the user's account that is more than merely a default of whether the funds available is equal to or greater than the purchase price. Finally, a party to the transaction may wish to set a criteria regarding a time and date at which the purchase transaction occurs in relation to business hours, because settlement of the actual transfer of funds may generally occur only during business hours.

In one particular embodiment, the criteria may allow the purchase transaction to proceed only when the funds available in the user's cash-equivalent account exceed the purchase transaction price by a preset amount determined by at least one of the originating financial institution and the user. In particular, the user may set a minimum balance threshold for the user's account at the originating financial institution such that any purchase transaction that would draw down the user's balance to below this threshold would be rejected. This may allow the user to plan their personal finances and avoid overdrafts from other transactions that, for example, include a check that hasn't yet been cashed.

In these embodiments involving any of various criteria, computing device 316 therefore checks information contained within the purchase transaction initiation 404 from user 406 against the criteria in the pre-established merchant transfer association 412 at step 414. If the criteria is not met, computing device 316 generates and sends a message to the user 416. The computing device 316 may then again receive an input 406 so as to initiate another loop of checking the newly received purchase transaction initiation information against the criteria. If the criteria is met, computing device 316 may proceed to initiate the transfer of funds from the originating bank to the merchant's bank at step 418.

After the funds transfer is initiated, computing device 316 then may generate a message confirming completion of the purchase transaction at step 420.

Figure 5A:
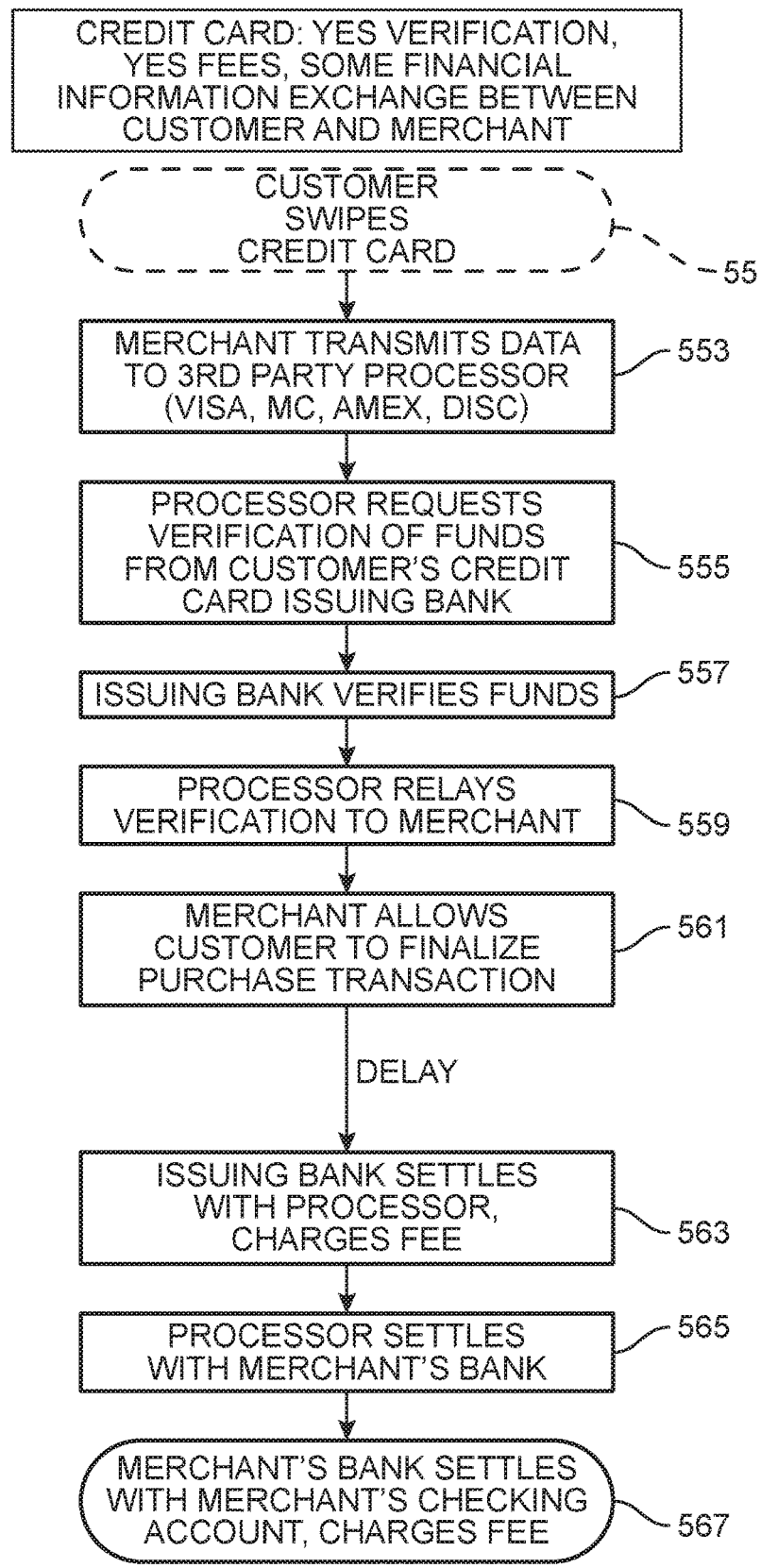
FIG. 5A shows a flow chart of a prior art method for operating a credit card payment processing network.
Figure 5B:
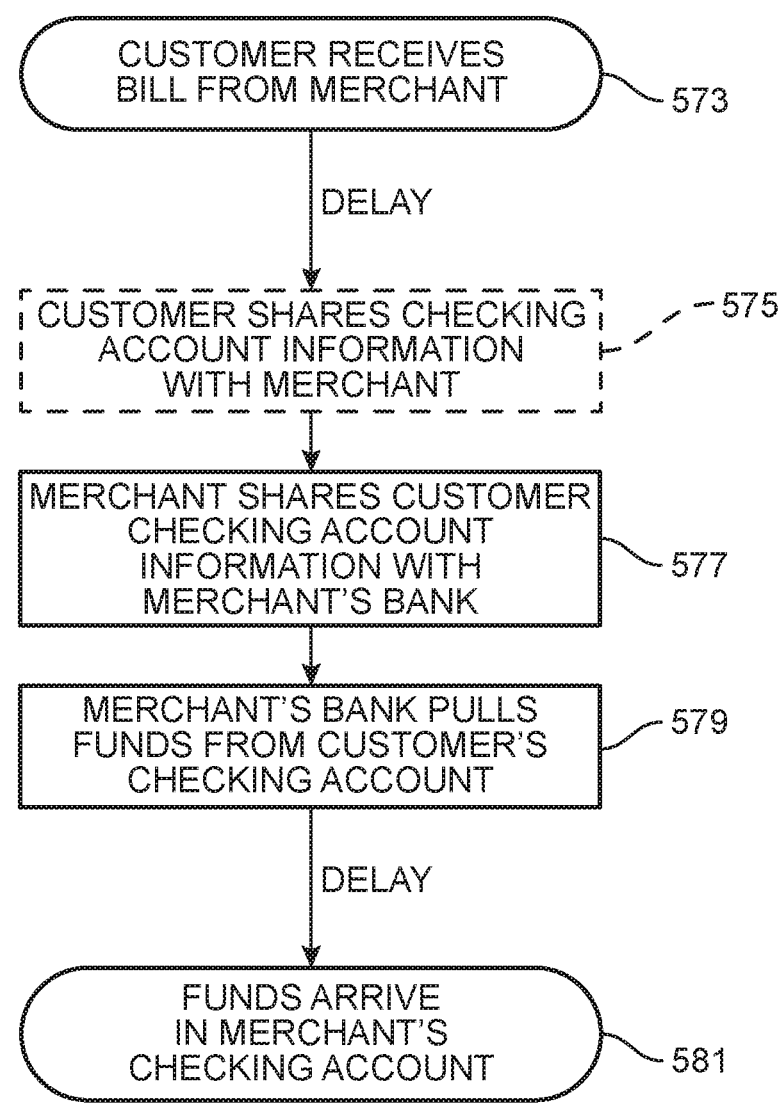
FIG. 5B shows a flow chart of a prior art method for operating an ACH "pull" payment processing network.
Figure 5C:
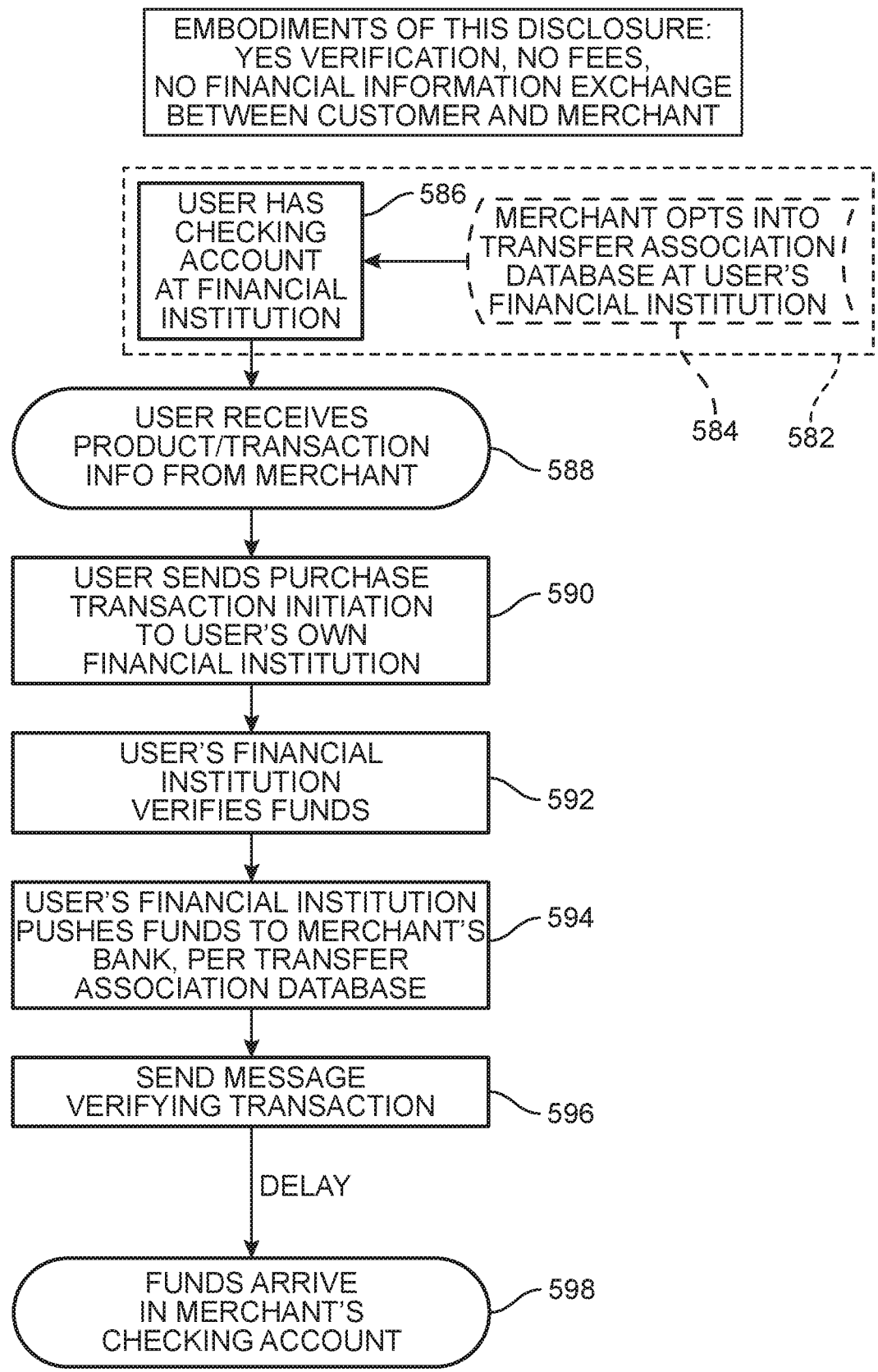
FIG. 5C shows a flow chart of a method for operating a payment processing network in accordance with this disclosure.

FIGS. 5A-C show several flowcharts that compare prior art payment processing networks (FIG. 5A and FIG. 5B) with a payment processing network in accordance with this disclosure (FIG. 5C). These figures may be compared and contrasted with FIG. 4 described above. These figures may also be understood with reference to FIGS. 1A, 1B, and 2 also described above.

Figure 1A:
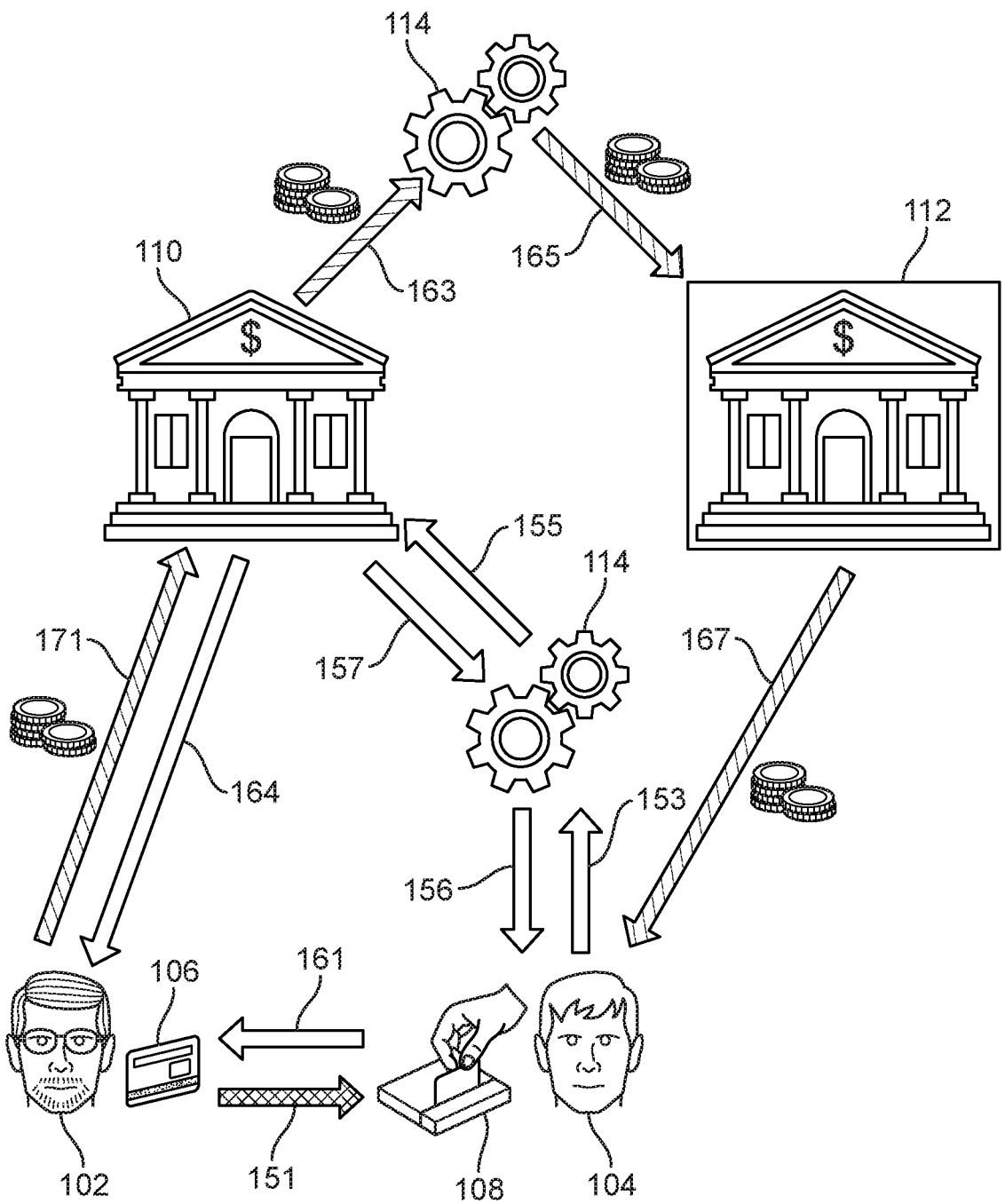
FIG. 1A shows a prior art credit card payment processing network.

Specifically, FIG. 5A is a flow chart showing the operation of a prior art credit card payment processing network as illustrated in FIG. 1A. In a credit card payment processing network, the first step 551 occurs when the customer swipes their credit card with a merchant's credit card machine. Step 551 therefore includes an exchange of sensitive financial information between the customer and the merchant, as noted by the dashed outline of step 551.

Next, the merchant transmits data about the purchase transaction, such as the price, to the third party payment processing network in step 553—such as the well-known credit card processors Visa, MasterCard, American Express, and Discover Card. The third party processor then requests verification of funds from the customer's bank that issued the credit card at step 555. The credit card issuing bank then responds to the third party credit card payment processor to verify the funds at step 557. The third party credit card payment processor then relays that verification back to the merchant at step 559. After receiving the verification, the merchant then allows the customer to finalize the purchase transaction at step 561.

After these steps occur, after some delay, the settlement part of the process happens whereby funds are actually transferred electronically between the banks with the third party payment processor as an intermediary. Namely, the credit card issuing bank (the customer's bank) settles with the third party credit card payment processor at step 563 by transferring funds electronically from the customer's bank to the third party credit card payment processor. This step involves approximately 2%-3% of the transaction purchase price in fees. The third party credit card payment processor then settles with the merchant's bank, by transferring funds to them, at step 565. Finally, the merchant's bank settles with the merchant's own account at the merchant's bank and charges some additional fees at step 567.

Overall, existing credit card payment networks provide the advantage of verification of funds prior to complete of the purchase transaction—but they do this at the cost of significant fees.

Figure 1B:
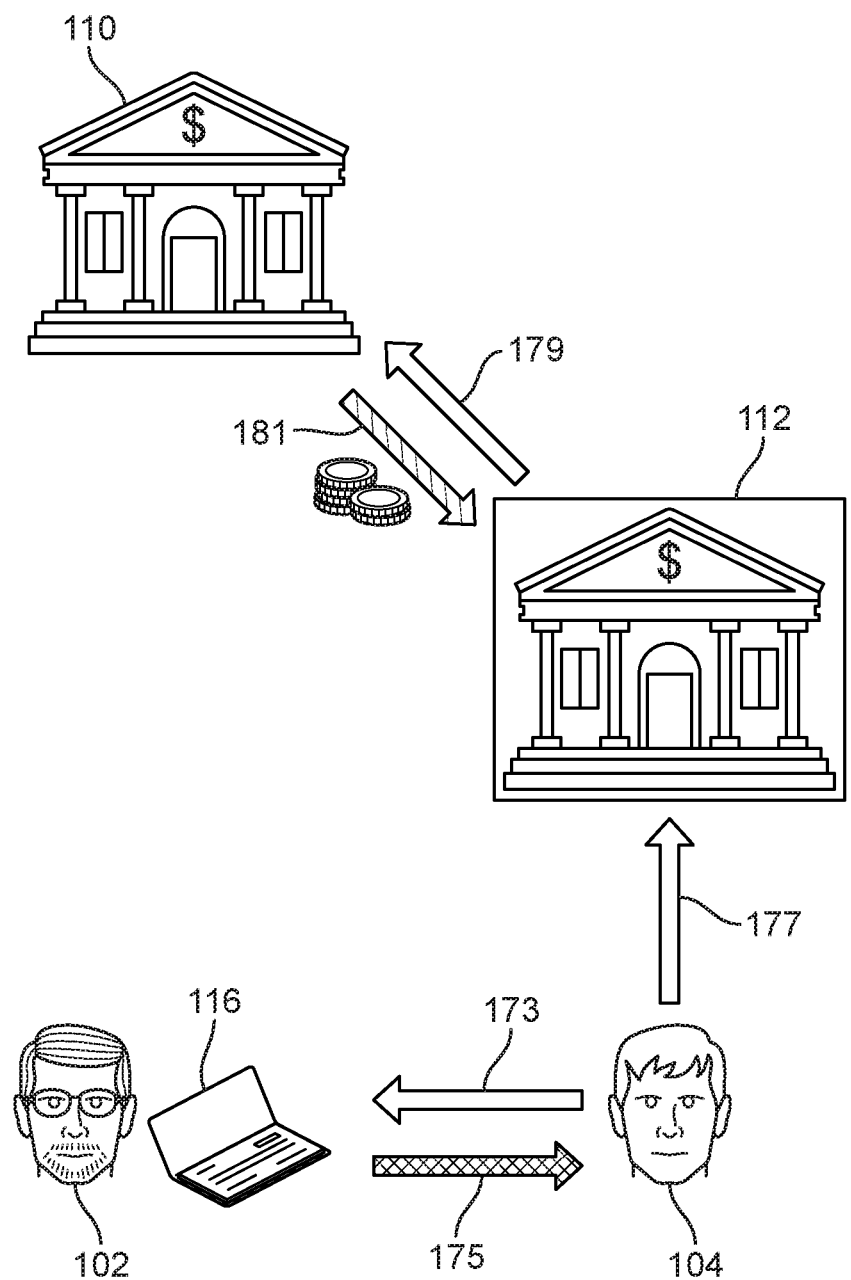
FIG. 1B shows a prior art ACH payment processing network, that pulls funds from a customer's checking account.

For comparison, FIG. 5B shows an ACH "pull" bill pay payment processing network in action, as discussed with respect to FIG. 1B above, Namely, a customer first received a bill from the merchant at step 573, This may be before or after services are rendered or goods are transferred. The customer may then typically allow some delay before acting on the bill. Next, the customer shares the customers checking account information with the merchant at step 575. In this step, the customer may typically authorize the merchant to pull the currently billed amount, or any future billed amounts, or both. Step 575 therefore includes an exchange of sensitive financial information between the customer and the merchant, as noted by the dashed outline of step 575.

Next, the merchant shares the customers checking account information with the merchant's own bank, at step 577. In step 579, the merchant's bank "pulls" the funds from the customer's checking account by transmitting a request for the funds to the customers bank. After some delay, usually three business days, the funds arrive in the merchant's checking account at settlement at step 581. Little to no fees are charged to either the merchant or the customer, because the ACH system on which this payment network is based generally charges almost zero fees.

Overall, this existing ACH "pull" payment network therefore provides low cost payment processing. However, there is no verification of funds prior to a transaction occurring—and this payment network still includes an exchange of sensitive financial information between the customer and the merchant.

In contrast, FIG. 5C shows how a payment processing network in accordance with this disclosure provides verification of funds prior to closing a purchase transaction, yet still charges little to no fees. As discussed with respect to FIG. 2 and FIG. 4, the process begins with a merchant who opts in to a transfer association database 584 at the user's financial institution at step 582. As noted, the process also of course requires that the user have a checking account (or other cash-equivalent account) at a first financial institution at 586.

Next the user receives product or transaction information from the merchant to initiate a specific purchase transaction at step 588. The user then sends a purchase transaction initiation to the user's own financial institution at step 590, the initiation generally including at least a purchase transaction price. The user's financial institution then verifies that the funds are available in the user's account, at step 592. If the funds available are equal to or greater than the purchase transaction price, the user's financial institution proceeds to initiating a "push" of funds from the user's financial institution to the merchant's financial institution, in accordance with the information in the merchant transfer association 584 at step 594.

In some embodiments, the step 594 of initiating a transfer of funds may include additional features designed to provide additional benefits. Namely, one of the drawback of ACH based transfer is that funds are not actually "settled" (transferred) until one or more business days later after the initiation of the funds transfer. This may create complications for the user, the user's bank, or both. For example, the funds may sit in the use's account until settlement—and this may cause the user to think they have more money than they actually do, and cause overdrafts when the money earmarked for the purchase transaction is otherwise spent or withdrawn by another method. As a result, payment processing networks in accordance with this disclosure may include one or more features to alleviate this problem.

Specifically, in one embodiment the system may generate and send a message to the user regarding available funds in the user's cash-equivalent account after the purchase transaction is completed, so as to notify the user that: (1) funds used in the purchase transaction will not be withdrawn from the user's cash-equivalent account until a later time, and that (2) the user should not otherwise withdraw or spend the funds used in the purchase transaction. This message may act as a reminder, so as to continually inform the user of the of the "true" balance in their account—without the need to place a true hold on any funds. In some embodiments, this message may be transmitted to a user's smartphone app that is provided by the user's financial institution.

In alternative embodiments, the user's financial institution may structure the payment processing system so as to best control which account the funds are transferred out of, in order to address these issues. Namely, as discussed above, in some embodiments the funds may be transferred directly out of the user's own cash-equivalent account—in these embodiments, the user's financial institution may place a hold on the funds in the user's account in an amount equal to the purchase transaction price. Specifically, the system generates and sends instructions to the originating financial institution causing the originating financial institution to place a temporary hold on an amount of funds in the user's cash-equivalent account equal to the purchase transaction price, the temporary hold expiring when the funds are transferred to the merchant's financial institution. In these embodiments, the system may also generate and send a message to the user after the purchase transaction is completed regarding available funds in the user's cash-equivalent account—so that the user is aware of the hold. The hold then expires when the funds are transferred to the merchant's financial institution.

In a different embodiment, the user's financial institution may create a "sweep" account to act as the initiating cash-equivalent account at the originating financial institution from which funds are transferred.

In these embodiments, the system causes the originating financial institution to transfer funds from the user's cash-equivalent account to the sweep account at the time of the purchase transaction. Then the system causes the originating financial institution to transfer funds from the sweep account directly to the merchant's financial institution at a time subsequent to the purchase transaction. In this way, the originating financial institution creates a sweep account owned by the originating financial institution and transfers funds from the user's account to the sweep account immediately—which is easily done because this is an intra-bank transfer. The funds then sit in the sweep account until settlement occurs later between the two different banks.

After the details of initiating the funds transfer have been worked through by the system, the user's financial institution then sends a message to at least one of the user and the merchant that verifies that the purchase transaction has been successful in step 596.

Finally, after some delay commonly of one or more business day, the funds arrive at the merchant's financial institution in step 598. Specifically, in some embodiments, the fund arrive directly into the merchant's checking account at the merchant's financial institution.

Figure 6:
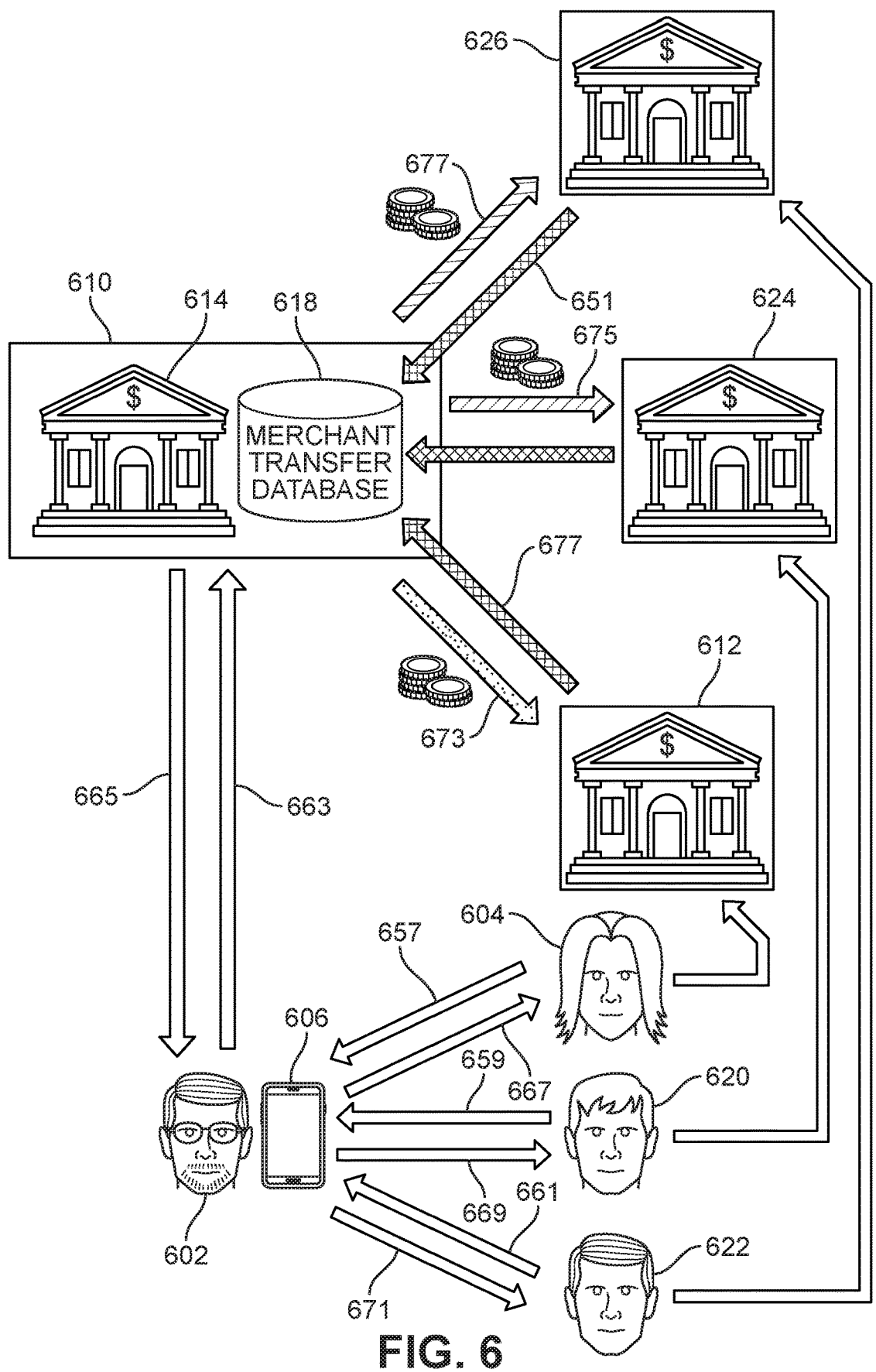
FIG. 6 shows a payment processing network in accordance with this disclosure, including multiple merchants and multiple merchants' banks in the merchant transfer database.

FIG. 6 shows another embodiment of a payment processing network in accordance with this disclosure, that includes multiple merchants and multiple merchants' banks associated with the merchant transfer database. Specifically, user 602 may wish to do business with any of several merchants 604, 620, 622 using the same payment processing network. In order to do so, each of the merchant's banks would have to opt-in to provide merchant transfer information that may be stored in the merchant transfer database.

Specifically, first merchant 604 may be associated with first merchant's bank 612 that opts-in to a first merchant transfer association 655 by sharing relevant account information with the customer's bank 610. Second merchant 620 may then be associated with second merchant's bank 624 that creates a second merchant transfer association 653 with customer bank 610. Similarly, third merchant 622 may be associated with third merchant's bank 626 that establishes third merchant transfer association 651 with customer bank 610. Each of the merchant transfer associations 651, 653, 655 are then stored in the merchant transfer association database 618 that is a part of the customer's bank 610. As a result, customer 602 may use his smartphone 606 to receive information (657, 659, 661) from any of the several merchants to initiate a purchase transaction, then communicate this (663) to the user's bank 610 to verify funds. As discussed above, user's bank 610 then confirms that the purchase transaction is completed 665 and the user may communicate this back to merchants 604, 620, 622 at 667, 669, 671. Settlement between user's bank 610 and any of the merchant's banks 612, 624, 626 then occurs at a later time 673, 675, 677. In this way, the merchant transfer association database includes information describing two or more pre-established transfer associations, each of the two or more pre-established transfer associations being associated with a different merchant.

Figure 7A:
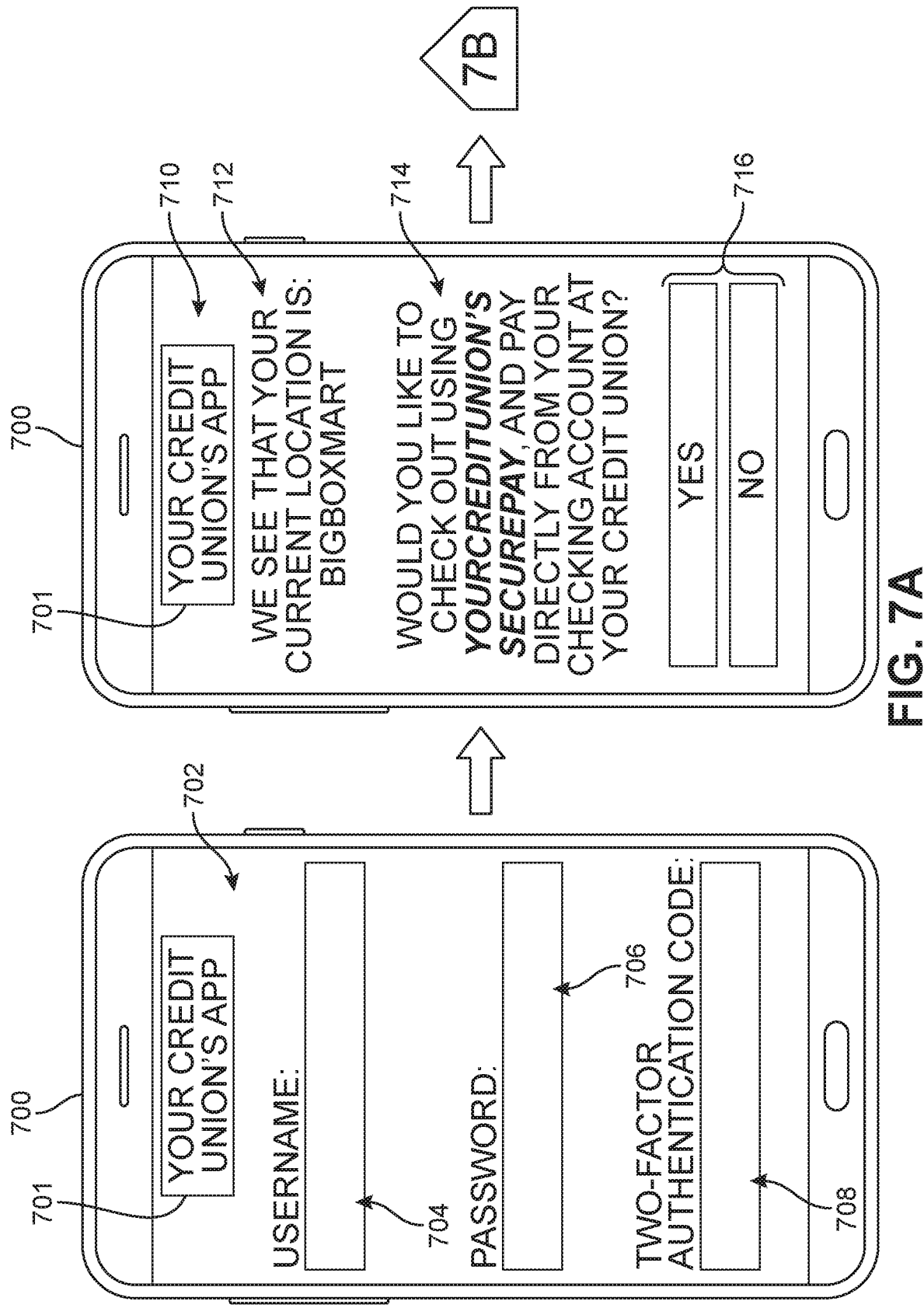
FIG. 7A shows a mobile computing device running an app that allows payment via a payment processing network in accordance with this disclosure.

FIG. 7A shows a smartphone 700 app 701 that interfaces with the payment processing network described in this disclosure. In some embodiments, smartphone 700 may be the at least computing device in a system that performs the steps associated with operating the payment processing network in accordance with this disclosure. In other embodiments, smartphone 700 may execute instructions stored on a non-transitory computer readable storage medium, that includes instructions which, when executed by the smartphone 700, carry out a method for securing purchase transactions between a user and a merchant.

Smartphone app 701 includes a user portal 702 associated with the user's financial institution. The user portal allows a user to log into the app 701 securely, by using for example a username 704, password 706, and a two factor authentication code 708. Generally, the mobile computing device 700 is further configured to include one or more user security and verification features (704, 706, 708), so as to ensure that the mobile computing device user is authorized to access the account at the user's financial institution. Other security measure may include fingerprint scanning, facial recognition, retina scans, and others. Generally, app 701 is the "authorized" app created and maintained by the user's financial institution as the official smartphone app for accessing accounts at that financial institution.

After logging in, smartphone 700 app 701 may prompt 710 the user to initiate a purchase transaction. Prompt 710 may include location aware features 712 that use the smartphone's 700 GPS location system. For example, smartphone 700 may automatically detect if the user is physically located near (or within) a merchant that uses a payment processing network in accordance with this disclosure. Additional location aware features may also be included in app 701, such as: a geographic relationship between the user's home and a preferred merchant, geographic relationship between a merchant's multiple sites, or others.

Prompt 710 may display details 714 about a payment processing network in accordance with this disclosure, so as to explain the nature of the payment processing network to new users. The user would, of course, have the ability to accept or decline 716 use of the payment processing network.

Figure 7B:
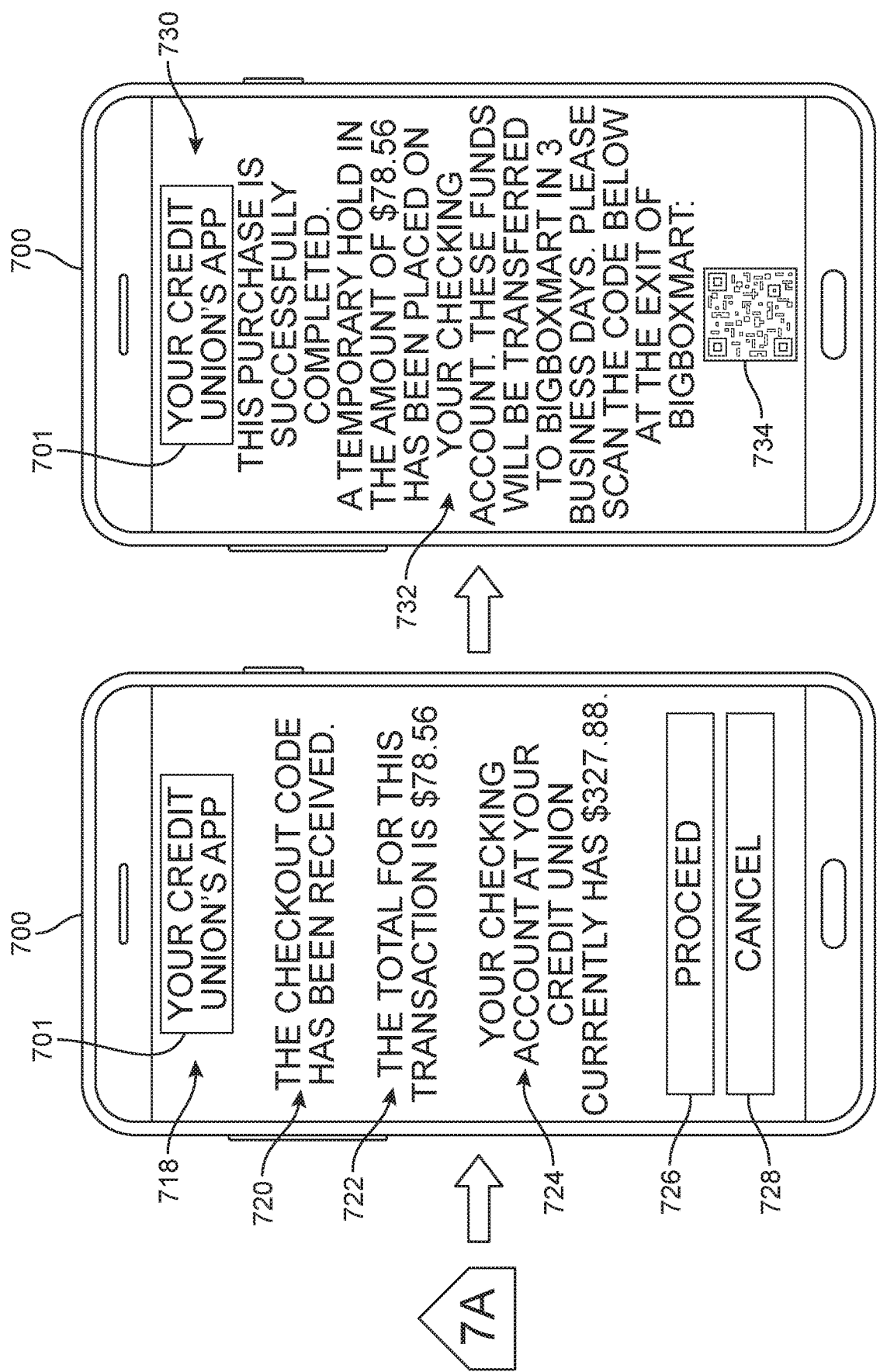
FIG. 7B shows a mobile computing device running an app that has processed a payment, and provided confirmation of the transaction to the user and merchant.

As shown in FIG. 7B, a user next receives a checkout code from the merchant regarding the nature, price, etc. of the transaction. With reference to FIG. 2, user 202 received information 253 from merchant 204 regarding the purchase transaction. Mobile computing device 700 app 701 then may display 718 that the checkout code has been received 720, the purchase transaction price 722, and the funds available in the user's account 724. User may then select prompt 726 to proceed to complete the purchase transaction, or prompt 728 to cancel the transaction.

Mobile computing device 700 app 701 may then display 730 a confirmation message 732, 734 showing that the purchase transaction has been completed successfully. In particular, confirmation message 732 may be sent to the user for the user's benefit—and confirmation message 734 may be displayed for the merchant's benefit. Namely; confirmation message 734 may be a machine readable QR code that the user may scan in order to exit the merchant's building—to comply with a security precaution installed by the merchant to prevent theft.

Figure 8:
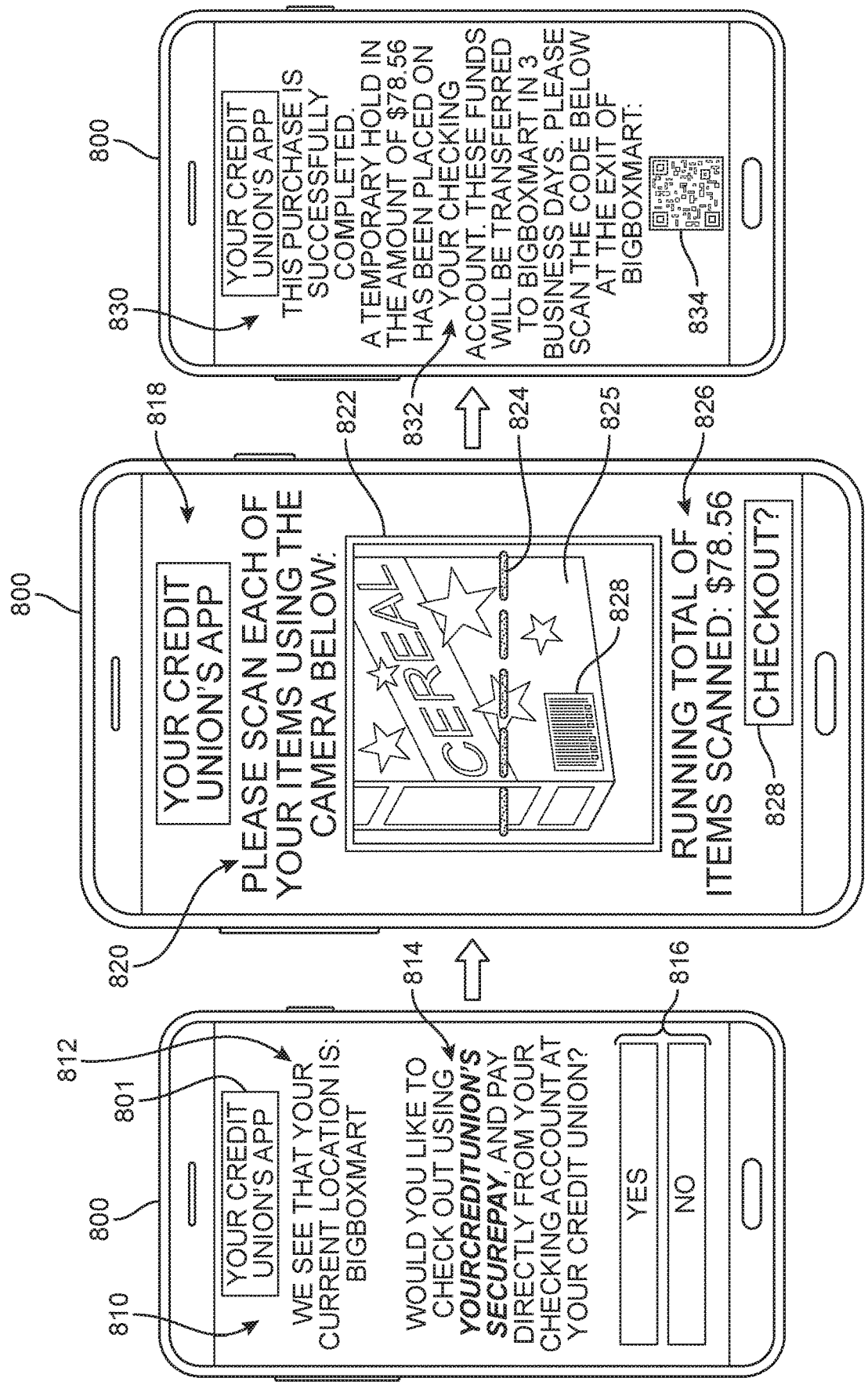
FIG. 8 shows a mobile computing device running an app that facilitates a purchase transaction between a user/customer and a merchant, by allowing the user to scan each item they are purchasing so as to check-out without interacting with a cashier.

FIG. 8 shows an additional feature of a smartphone 800 application 801 that further facilitates a user's shopping with a merchant. As discussed above; app 801 may include location aware features 812 displayed with a prompt 814, 816 to use the payment processing network. But smartphone 800 app 801 may also include features that allow a user to scan items sold by the merchant into the app 801. These features may allow a user to check-out from the merchant without the need for a cashier to ring-up the user's products.

Specifically, smartphone 800 app 801 may include display 818 that prompts the user 820 to use the smartphone's camera 822 as a scanner 824 to identify one or more products to be purchased. As shown in FIG. 8, product 825 may be a box of cereal with a UPC machine readable code 827. App 801 may in this way receive a product input for each product being purchased by the user. Although not necessarily limited to this embodiment, app 801 may therefore receive said product input by scanning a machine readable code using a camera in the mobile computing device 800.

Display 818 may also include a running total 826 of the purchase transaction price of items for which a product input has been received by the mobile computing device. Display 818 may then further include a prompt 828 that allows the user to indicate that they are done scanning items; and ready to complete the purchase transaction. After completing the purchase transaction, app 801 may generate and display 830 a message 832, 834 confirming that the purchase transaction has been completed successfully. Message 834 may again be a OR machine readable code.

Figure 9:
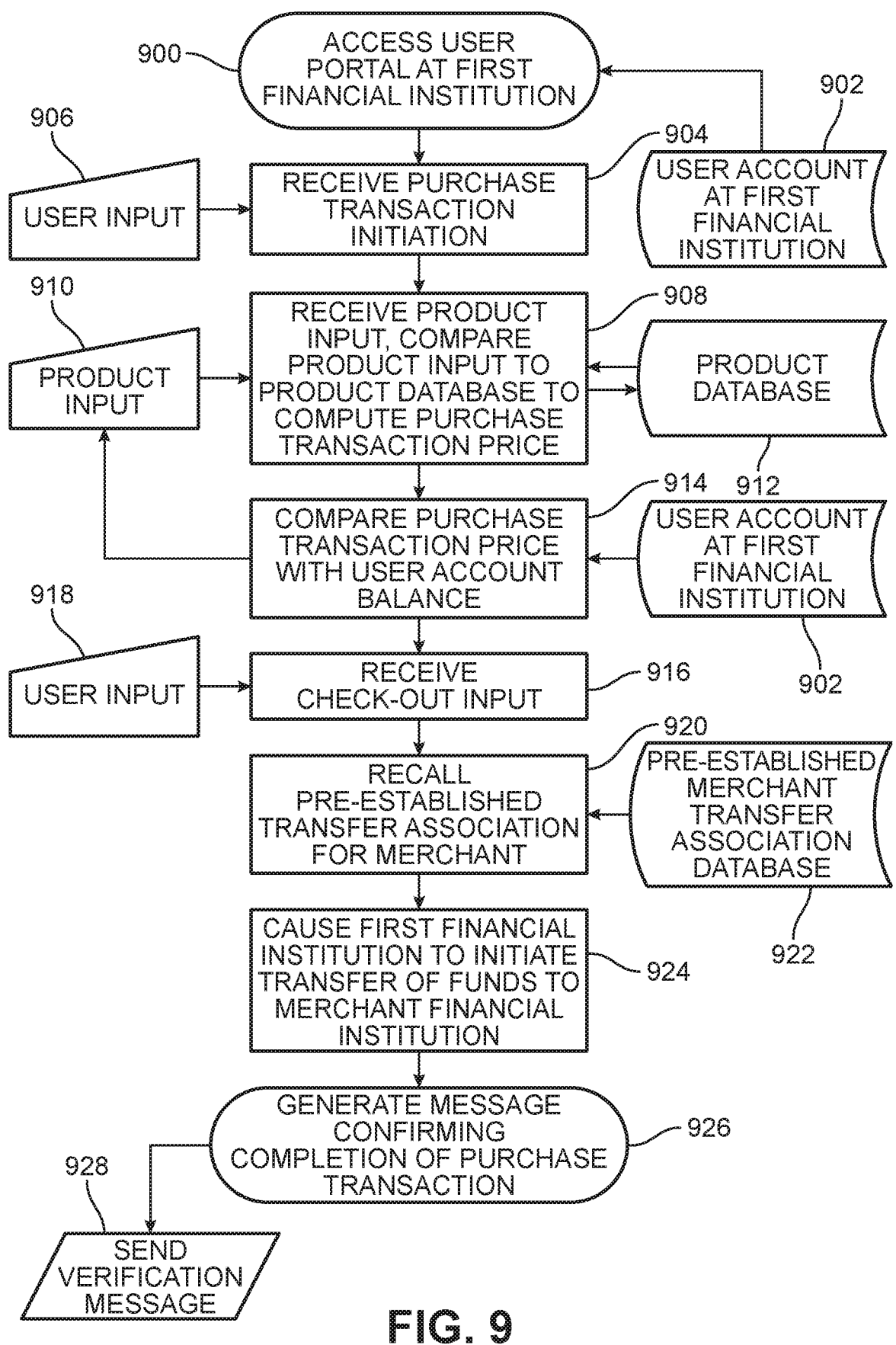
FIG. 9 shows a flowchart of a method of operating a mobile computing device to allow a user to scan items themselves and check-out without a cashier, and also pay with a payment network in accordance with this disclosure.

FIG. 9 is a flowchart further detailing the process by which smartphone app 801 operates.

As discussed above with respect to other embodiments, mobile computing device app 801 may first access 900 a user portal at a first financial institution associated with the user 902. App 801 next may receive a purchase transaction initiation in step 904, as shown in FIG. 8 in display 810. Next, app 801 may receive product input 910 as shown in FIG. 8 in display 818. Importantly, app 801 may access a merchant product database 912. Merchant product database 912 may include details about each product or service offered by the merchant, including at least a price of each. App 801 may compare each product input 910 to the product database 912 to compute a purchase transaction total price.

Purchase transaction price computed in step 908 may be displayed at 826 in FIG. 8. App 801 may then compare the purchase transaction price to the funds available in a user's account with the first financial institution. Although not shown in FIG. 8, in some embodiments app 801 may include a display like display 718 in FIG. 7B which visually compares the purchase transaction price to the funds available in the user's account.

However, in other embodiments, app 801 may compute and re-compute a running total price after receiving each of two or more product inputs, then compare the running total price to the funds available in the user's cash-equivalent account after receiving each product input, and finally generate and display a message to the user when the running total price accords with one or more criteria predefined by the user, alerting the user to the criteria being triggered. FIG. 9 shows how steps 908 and 914 may loop, for each product input received. The message altering the user to the criteria being triggered may be, for example, a direct comparison between the purchase transaction price and the funds available in the user's account—so that no alert is displayed until the purchase transaction price exceeds the funds available. In other embodiments, the criteria in this feature may accord with one or more budgeting predefined personal spending limits discussed below.

App 801 then receives a user input 918 to check-out at step 916. FIG. 8 shows prompt 828 that accords with step 916. Once app 801 receives the check-out input 918, app 801 may then 920 recall a pre-established merchant transfer association from a merchant transfer association database 922, as discussed variously above. Steps 924, 926, and 928 are also substantially similar to equivalent steps discussed above with respect to other embodiments.

Figure 10:
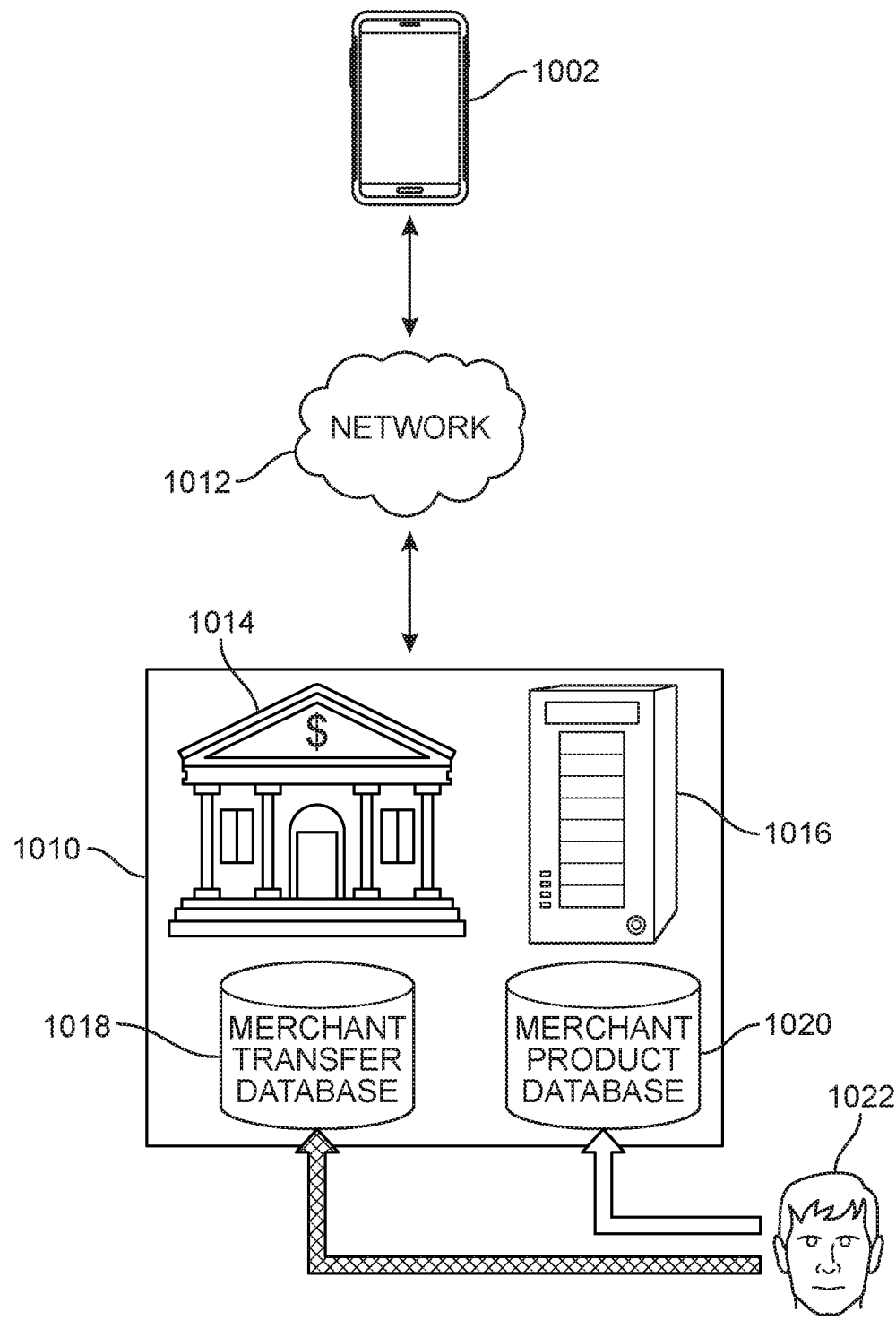
FIG. 10 shows a system that operates a payment processing network in accordance with this disclosure, and further integrates a self-checkout shopping facilitator.

FIG. 10 shows a system that operates the payment processing network and related product identification features. Namely, mobile computing device 1002 is in communication with a network 1012, which in turn is in communication with first financial institution 1010 at which a user has an account. In this embodiment, in contrast with the embodiment shown in FIG. 3, merchant 1022 provides information to the merchant transfer database 1018 and also the merchant product database 1020. Specifically, merchant transfer database 1018 may include the routing and account number for the merchant's bank account—while merchant product database 1020 may be a much more complicated database of various product information (including price) for a wide number of products or services sold by the merchant. Product database 1020 may therefore require regular communication between merchant 1022 and first financial institution 1010. In some instances, merchant 1022 may offer an application programming interface ("API") that provides electronic access to their product database for use by third parties like financial institution 1010.

Figure 11:
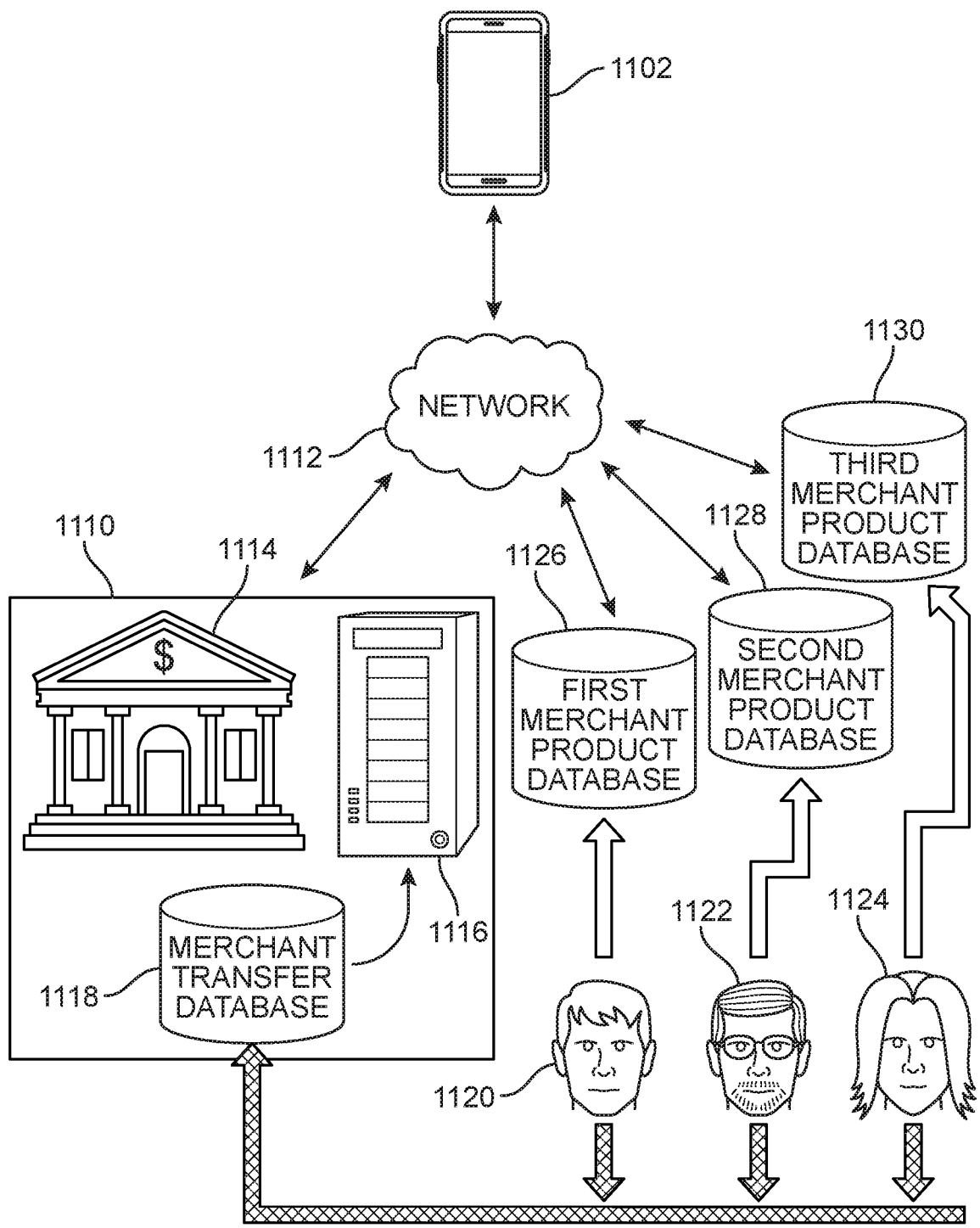
FIG. 11 shows a system that operates a payment processing network and an integrated self-checkout shopping facilitator, among multiple merchants.

FIG. 11 shows another system that operates a payment processing network and related product identification features in accordance with this disclosure. Specifically, FIG. 11 shows how multiple merchants may play a role in the system. First merchant 1120 may provide information to merchant transfer association database 1118 at first financial institution 1110, second merchant 1122 may also provide information into merchant transfer association database 1118, and third merchant 1124 may also provide merchant transfer association information into database 1118. In this embodiment, each merchant runs its own separate merchant product database. Mobile computing device 1102 may then be in communication with each of first merchant product database 1126, second merchant product database 1128, and third merchant product database 1130 via network 1112.

In the embodiment shown in FIG. 11, the mobile computing device is thus configured so that the user may conduct a purchase transaction at any of multiple different merchants within a single mobile computing device application.

The embodiment shown in FIG. 11 differs from the embodiment shown in FIG. 10 not only in the number of merchants (and associated merchant product databases), but also in the nature of how the merchant product databases are operated. Namely, in FIG. 10 the merchant product database is part of the first financial institution 1010. In contrast, in FIG. 11 each of the merchant product databases 1126, 1128, 1130 are separate from the first financial institution 1110. Each of these system architectures may present certain advantages and disadvantages, such as ensuring smooth interface with app 801 (when the merchant product database is part of the first financial institution 1010) vs. the ability to constantly ensure the merchant product database is fully updated and accurate (when apart from first financial institution 1110.)

In another embodiment not shown, one merchant product database within first financial institution may include information associated with two or more different merchants. As a result of this configuration, the mobile computing device 800 receives information in the product database from the first financial institution. In this embodiment, the merchant transfer association database also includes information describing two or more pre-established transfer associations, each of the two or more pre-established transfer associations being associated with a different merchant.

In any of these several embodiments, merchant transfer association database 1018, 1118 are part of the first financial institution 1010, 1110.

Figure 12:
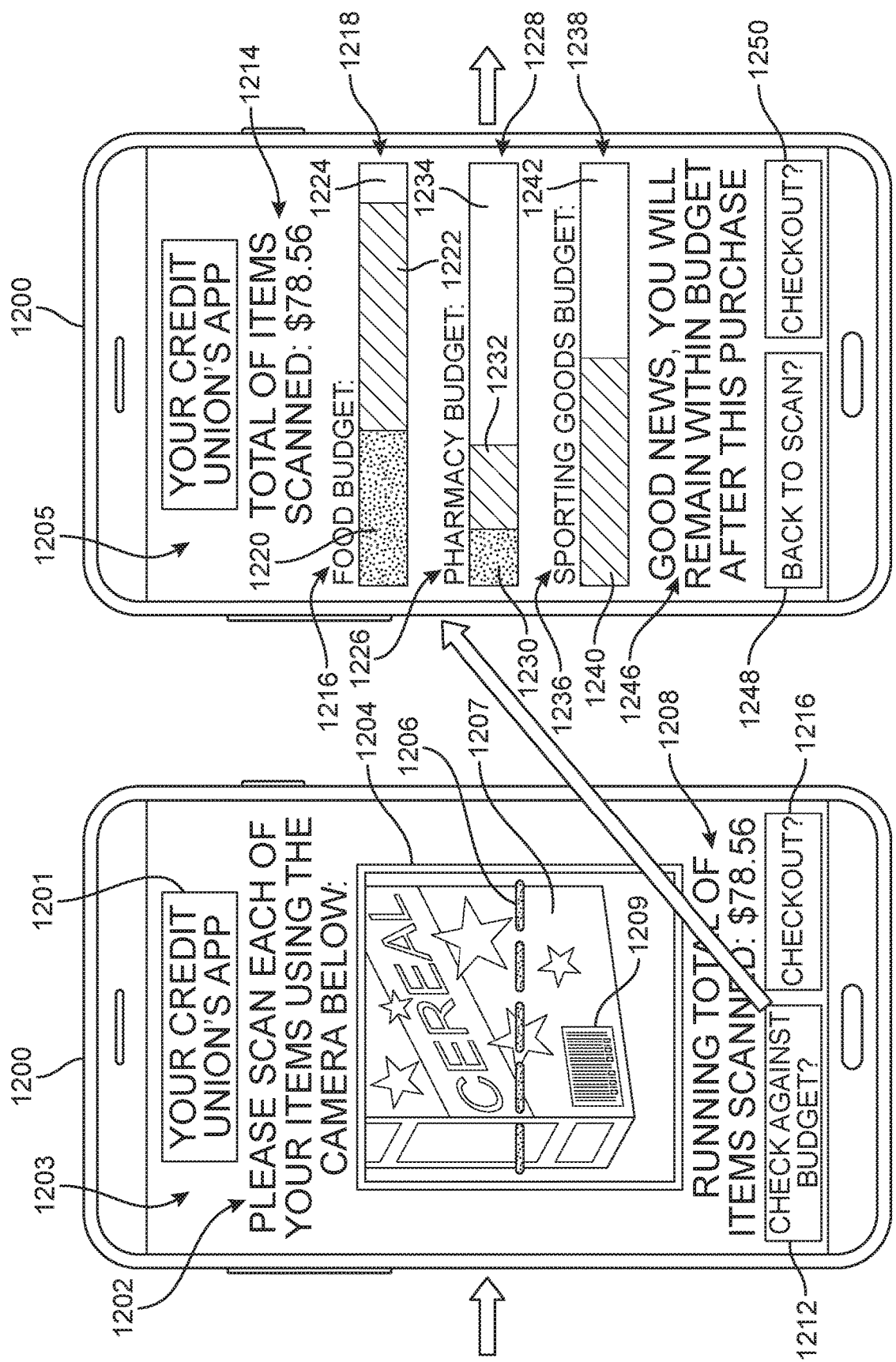
FIG. 12 shows a mobile computing device running an app that checks a purchase transaction running total against the customer's personal spending budgets, prior to checkout.

FIG. 12 shows an additional feature of a mobile computing device 1200 application 1201 that further enhances its utility to the user/customer. Specifically, App 1201 includes display 1203 that is substantially similar to display 818 in FIG. 8—with the additional of prompt 1212 that allows a user to check the items scanned to be purchased against one or more personal spending budgets. Display 1205 shows how the total purchase transaction price 1214 may be graphically compared against three personal spending categories.

Specifically, first personal spending category 1216 is labeled food budget. Bar graph 1218 shows a total budgetary valuation, broken down into three categories: previously spent amount 1220, amount in this transaction 1222, and leftover to spend 1224. Second personal spending category pharmacy budget 1226 similarly includes previously spend amount 1230, amount in this transaction 1232, and leftover to spend 1234 split across second bar graph 1228. Third personal spending category sporting goods budgeting 1236 does not include a previously spent amount, and so only includes an amount in this transaction 1240 and an amount leftover to spend 1242 in third bar graph 1238.

In order to create the budget categories, smartphone 1200 app 1201 may receive an input from the user specifying one or more budgeting categories and a valuation for each budgeting category, the budgeting categories being classifications of the user's spending. During a purchase transaction, app 1201 may then classify each product being purchased by the user into the one or more budget categories as each product input is received by the mobile computing device. App 1201 may then compare a price of each product being purchased by the user to the valuation for each budgeting category and any prior spending in each budgeting category, to determine by what amount the total spent in each budgeting category would change upon completion of the purchase transaction.

Finally, as shown in FIG. 12, app 1201 may generate and display on the mobile computing device a message to the user indicating by what amount the total spent in each budgeting category would change upon completion of the purchase transaction. All of these steps occur prior to receiving an input from the user that the purchase transaction is ready to be checked-out. These features thereby allow a user to compare their in-progress spending to their personal budget, before completing the transaction, on an item-by-item basis. This may provide useful feedback to the user on their spending habits in real time, so that different decisions about spending could be made before completing the purchase transaction.

Figure 13:
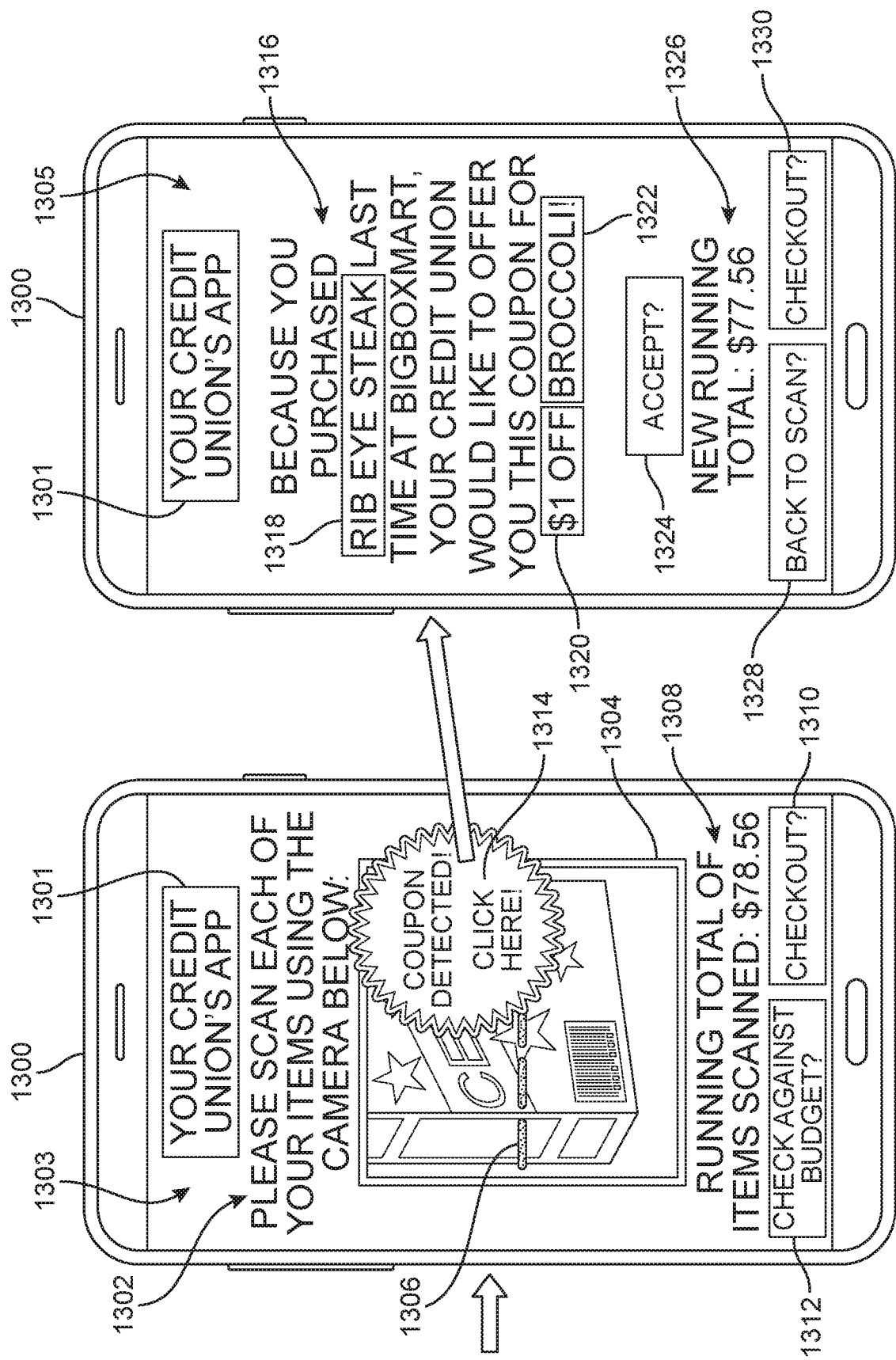
FIG. 13 shows a mobile computing device running an app that offers a coupon to the user/customer from the user's financial institution, based on the user's purchase history.

Finally, FIG. 13 shows another feature of a mobile computing device 1300 app 1301 in accordance with this disclosure. Smartphone app 1301 includes display 1303 that is substantially similar to display 818 in FIG. 8 except that message 1314 is displayed. Message 1314 indicates that a coupon is available to apply to this purchase transaction. If the use is interested in using the coupon, the user may click on message 1314 so as to cause mobile computing device 1300 app 1301 to change to display 1305. Display 1305 includes a message 1316 communicating one or more criteria for receiving the coupon.

Namely, display 1305 indicates that the user's purchase history included a first item 1318 that triggered a coupon 1320 applicable to a second item 1322. In this embodiment, the user's purchase of ribeye steak 1318 triggered a coupon 1320 for broccoli 1322. Display 1305 then further includes a prompt 1324 by which a user can accept the coupon, and then a new running total of the purchase transaction price after the coupon would be applied 1326. Additional navigation prompts 1328 and 1330 also gives the user the choice of which action to take next.

The embodiment of FIG. 13 may include these features as a result of app 1301 sending to the first financial institution a record of each prior purchase transaction, to be stored in a user purchase history database. The user's financial institution may therefore have a record of items purchased by the user, with the user's opt-in permission to share this information with the user's financial institution. This feature provides the user's financial institution with specific data about the user's spending habits, that would not be available to the user's financial institution absent the present system that incorporates a merchant product database. The user's financial institution may use this data to better serve its customers, in ways like insurance products, financial products, customer service, and others.

In return for sharing this data, the user's financial institution may offer the user an incentive, such as the coupon, based on the information associated with the user in the user purchase history database. This incentive may both reward the user, and also nudge the user's future actions toward behavior that is desired by both the user and the user's financial institution—such as eating healthier. Nudging future behavior may occur by targeting the incentive towards a certain benefit during a future purchase transaction with a merchant, such as buying broccoli next time the user is at the grocery store.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A mobile computing device configured to:
allow a user to log into a user portal associated with a first financial institution;
receive an input from the user to commence a purchase transaction between the user and a merchant;
access account balance information regarding funds available in a cash-equivalent account associated with the user, the cash-equivalent account associated with the user being at the first financial institution;
receive a product input for each product being purchased by the user, by scanning a machine readable code using a camera in the mobile computing device;
access a product database containing product information, the product database being associated with two or more different merchants, and receive product information associated with the merchant with whom the purchase transaction was commenced by receiving an input that includes scanning a machine readable code generated by the merchant, using a camera in the mobile computing device;
compare the product input to the product information and compute a purchase transaction price;
compare the purchase transaction price with the funds available in the cash-equivalent account associated with the user at the first financial institution;
receive an input from the user that the purchase transaction is ready to be checked-out;
send a purchase transaction initiation directly to the first financial institution, in response to the input from the user that the purchase transaction is ready to be checked-out;
recall information, in response to the input from the user that the purchase transaction is ready to be checked-out, from a merchant transfer association database integrated with the first financial institution describing a pre-established transfer association between the first financial institution and a second financial institution associated with the merchant; the merchant transfer association database including information describing two or more pre-established transfer associations, each of the two or more pre-established transfer associations being associated with a different merchant having a different respective second financial institution;
wherein the first financial institution initiates, responsive to the mobile computing device, a transfer of funds from the cash-equivalent account associated with the user at the first financial institution directly to a receiving cash-equivalent account associated with the merchant at the second financial institution, in accordance with the pre-established transfer association;
wherein each of the two or more pre-established transfer associations includes a routing number and account number of the receiving cash-equivalent account at the respective second financial institution, such that the pre-established transfer association enables an electronic transfer of funds via an Automated Clearing House network,
wherein the transfer of funds from the cash-equivalent account associated with the user at the first financial institution directly to the receiving cash-equivalent account associated with the merchant at the second financial institution occurs via the Automated Clearing House network;
receive a message from the first financial institution that the purchase transaction is successfully completed; and
display a message that the purchase transaction is successfully completed, the message including a machine readable code comprises a QR code or a UPC code scannable by a machine operated by the merchant for verifying completion of the purchase transaction.

2. The mobile computing device of claim 1, wherein:
the pre-established transfer association includes an account number and routing number for the merchant's receiving cash-equivalent account at the second financial institution.

3. The mobile computing device of claim 1, wherein the mobile computing device is further configured to:
send to the first financial institution a record of the purchase transaction, to be stored in a user purchase history database;
receive from the first financial institution an incentive, based on information associated with the user in the user purchase history database, that allows the user to receive a benefit during a future purchase transaction with the merchant.

4. The mobile computing device of claim 1, wherein the mobile computing device is further configured to:
receive an input from the user specifying one or more budgeting categories and a valuation for each budgeting category, the budgeting categories being classifications of the user's spending; and
classify each product being purchased by the user into the one or more budget categories as each product input is received by the mobile computing device;
compare a price of each product being purchased by the user to the valuation for each budgeting category and any prior spending in each budgeting category, to determine by what amount the total spent in each budgeting category would change upon completion of the purchase transaction;
generate and display a message to the user indicating by what amount the total spent in each budgeting category would change upon completion of the purchase transaction, prior to receiving an input from the user that the purchase transaction is ready to be checked-out.

5. The mobile computing device of claim 1, wherein each of the two or more pre-established transfer associations including data was transferred by each respective second financial institution from the second financial institution to the first financial institution, and stored by the first financial institution, upon request by the merchant prior to the first financial institution receiving the input from the user that the purchase transaction is ready to be checked-out.

6. The mobile computing device of claim 1, wherein the mobile computing device is further configured to:

compute and re-compute a running total price after receiving each of two or more product inputs;

compare the running total price to the funds available in the user's cash-equivalent account after receiving each product input; and generate and display a message to the user when the running total price accords with one or more criteria predefined by the user alerting the user to the criteria being triggered.

7. The mobile computing device of claim 1, wherein the mobile computing device is further configured to:

generate and send a message to the user after the purchase transaction is completed regarding available funds in the cash-equivalent account associated with the user; and generate and send instructions to the first financial institution to place a temporary hold on an amount of funds in the cash-equivalent account associated with the user equal to the purchase transaction price, the temporary hold expiring when the funds are transferred to the second financial institution.

8. The mobile computing device of claim 1, wherein the mobile computing device is further configured to include one or more user security and verification to ensure that the user is authorized to access the cash-equivalent account at the first financial institution.

* * * * *